(12) United States Patent
Moawad et al.

(10) Patent No.: US 12,174,641 B2
(45) Date of Patent: Dec. 24, 2024

(54) VEHICLE LOCALIZATION BASED ON RADAR DETECTIONS

(71) Applicant: Aptiv Technologies AG, Schaffhausen (CH)

(72) Inventors: Mohamed A. Moawad, Westfield, IN (US); Aniello Sorrentino, Wuppertal (DE); Nanhu Chen, Lafayette, IN (US); Michael H. Laur, Mission Viejo, CA (US); Jakub Porebski, Cracow (PL); Amith Somanath, Woodland Hills, CA (US); Aron Sommer, Cologne (DE); Kai Zhang, Carmel, IN (US); Uri Iurgel, Wuppertal (DE); Alexander Ioffe, Bonn (DE); Krzysztof Kogut, Cracow (PL); Ceyhan Karabulut, Oberhausen (DE); Damjan Karanovic, Kamp-Lintfort (DE)

(73) Assignee: Aptiv Technologies AG, Schaffhausen (CH)

( * ) Notice: Subject to any disclaimer, the term of this patent is extended or adjusted under 35 U.S.C. 154(b) by 747 days.

(21) Appl. No.: 17/367,289

(22) Filed: Jul. 2, 2021

(65) Prior Publication Data
US 2022/0197301 A1    Jun. 23, 2022

Related U.S. Application Data

(60) Provisional application No. 63/146,483, filed on Feb. 5, 2021, provisional application No. 63/127,049, filed on Dec. 17, 2020.

(51) Int. Cl.
| | | |
|---|---|---|
| *G05D 1/00* | (2024.01) | |
| *G01S 13/89* | (2006.01) | |
| *G01S 13/931* | (2020.01) | |

(52) U.S. Cl.
CPC ............ *G05D 1/0257* (2013.01); *G01S 13/89* (2013.01); *G01S 13/931* (2013.01)

(58) Field of Classification Search
CPC ..... G05D 1/0257; G01S 13/89; G01S 13/931; G01S 7/003; G01S 7/2955; G01S 13/86;
(Continued)

(56) References Cited

U.S. PATENT DOCUMENTS 8,989,944 B1 *  3/2015  Agarwal ................. G01S 15/86
                                                           340/576
9,194,949 B2   11/2015  Becker et al.
(Continued)

FOREIGN PATENT DOCUMENTS

| DE | 102012106932 | 5/2014 |
| DE | 102015002144 A1 | 8/2016 |

(Continued)

OTHER PUBLICATIONS

Abdelgalil, et al., "Multi-Robot SLAM: An Overview", Jan. 2019, 11 pages.
(Continued)

*Primary Examiner* — Peter M Bythrow
(74) *Attorney, Agent, or Firm* — Harness, Dickey & Pierce, P.L.C.

(57) ABSTRACT

This document describes methods and systems for vehicle localization based on radar detections. Radar localization starts with building a radar reference map. The radar reference map may be generated and updated using different techniques as described herein. Once a radar reference map is available, real-time localization may be achieved with inexpensive radar sensors and navigation systems. Using the techniques described in this document, the data from the radar sensors and the navigation systems may be processed to identify stationary localization objects, or landmarks, in
(Continued)

the vicinity of the vehicle. Comparing the landmark data originating from the onboard sensors and systems of the vehicle with landmark data detailed in the radar reference map may generate an accurate pose of the vehicle in its environment. By using inexpensive radar systems and lower quality navigation systems, a highly accurate vehicle pose may be obtained in a cost-effective manner.

21 Claims, 28 Drawing Sheets

(58) Field of Classification Search
CPC ........... G01S 13/876; G01S 2013/9316; G01S 2013/9322; G01S 13/91; G08G 1/123
See application file for complete search history.

(56) References Cited

U.S. PATENT DOCUMENTS

| | | | |
|---|---|---|---|
| 9,562,778 | B2 | 2/2017 | Duhadway et al. |
| 9,594,378 | B2 | 3/2017 | Laur et al. |
| 10,106,153 | B1 | 10/2018 | Xiao et al. |
| 10,345,107 | B2 | 7/2019 | Laur |
| 10,488,867 | B2 * | 11/2019 | Tojima .................... G01S 13/86 |
| 10,962,372 | B1 | 3/2021 | Rao |
| 11,835,643 | B2 * | 12/2023 | Tanaka .................... G01S 13/86 |
| 2002/0147544 | A1 * | 10/2002 | Nicosia .................... F21S 4/10 701/16 |
| 2004/0167709 | A1 | 8/2004 | Smitherman et al. |
| 2009/0228204 | A1 * | 9/2009 | Zavoli .................... G01C 21/30 701/532 |
| 2010/0280699 | A1 * | 11/2010 | Bageshwar .......... G05D 1/0231 701/25 |
| 2012/0310504 | A1 | 12/2012 | Duhadway et al. |
| 2013/0103298 | A1 | 4/2013 | Becker et al. |
| 2015/0022392 | A1 | 1/2015 | Hegemann et al. |
| 2015/0081211 | A1 * | 3/2015 | Zeng ...................... G01S 19/42 701/446 |
| 2015/0353083 | A1 | 12/2015 | Hasberg et al. |
| 2016/0321381 | A1 | 11/2016 | English et al. |
| 2017/0307751 | A1 | 10/2017 | Rohani et al. |
| 2018/0051998 | A1 | 2/2018 | Stephens et al. |
| 2018/0080785 | A1 | 3/2018 | Han et al. |
| 2018/0088574 | A1 | 3/2018 | Latotzki et al. |
| 2018/0188037 | A1 | 7/2018 | Wheeler et al. |
| 2018/0292840 | A1 * | 10/2018 | Sakai .................... G01C 21/20 |
| 2018/0325012 | A1 | 11/2018 | Ferrari et al. |
| 2018/0365908 | A1 | 12/2018 | Liu et al. |
| 2019/0087667 | A1 | 3/2019 | Foroughi et al. |
| 2019/0094025 | A1 * | 3/2019 | Lu ........................ G01C 21/005 |
| 2019/0196008 | A1 | 6/2019 | Lee et al. |
| 2019/0333232 | A1 | 10/2019 | Vallespi-Gonzalez et al. |
| 2019/0376807 | A1 | 12/2019 | Iagnemma |
| 2019/0384318 | A1 * | 12/2019 | Fuchs .................... G01S 13/86 |
| 2020/0101974 | A1 | 4/2020 | Ha et al. |
| 2020/0103523 | A1 | 4/2020 | Liu et al. |
| 2020/0124422 | A1 | 4/2020 | Lin Sorstedt et al. |
| 2020/0175315 | A1 | 6/2020 | Gowaikar et al. |
| 2020/0200545 | A1 | 6/2020 | Wappler et al. |
| 2020/0217943 | A1 | 7/2020 | Pishehvari et al. |
| 2020/0225622 | A1 | 7/2020 | Buerkle et al. |
| 2020/0226790 | A1 * | 7/2020 | Alvarez ................ G01S 13/865 |
| 2020/0249695 | A1 * | 8/2020 | Otto ...................... G05D 1/0278 |
| 2020/0278681 | A1 | 9/2020 | Gier et al. |
| 2020/0341486 | A1 | 10/2020 | Dia et al. |
| 2020/0348408 | A1 | 11/2020 | Peng et al. |
| 2021/0010814 | A1 * | 1/2021 | Demir .................... G01C 21/28 |
| 2021/0033411 | A1 | 2/2021 | Violetta |
| 2021/0063200 | A1 * | 3/2021 | Kroepfl ............... C03C 17/3644 |
| 2021/0163021 | A1 | 6/2021 | Frazzoli et al. |
| 2021/0180984 | A1 * | 6/2021 | Xu ...................... G01C 21/3694 |
| 2022/0135071 | A1 | 5/2022 | Smith et al. |
| 2022/0197301 | A1 | 6/2022 | Moawad et al. |
| 2022/0198929 | A1 | 6/2022 | Dudar et al. |
| 2022/0276659 | A1 * | 9/2022 | Mizui .................... G05D 1/246 |
| 2023/0080061 | A1 | 3/2023 | Wang et al. |

FOREIGN PATENT DOCUMENTS

| | | |
|---|---|---|
| DE | 102016003934 A1 | 10/2017 |
| DE | 102017214012 A1 | 2/2019 |
| DE | 102018218182 A1 | 4/2020 |
| EP | 3517996 A1 | 7/2019 |
| EP | 3671546 A1 | 6/2020 |
| WO | 2020157138 A1 | 8/2020 |

OTHER PUBLICATIONS

Holder, et al., "Real-Time Pose Graph SLAM based on Radar", Jun. 2019, 7 pages.
Javanmardi, "Autonomous vehicle self-localization based on abstract map and multichannel LiDAR in urban area", May 2018, 13 pages.
Li, et al., "Environment Mapping and Vehicle Localization with a High-Resolution Radar Prototype", Sep. 2019, 9 pages.
Pettersson, et al., "Estimation of Local Map from Radar Data", Masters Thesis, 2014—Retrieved at: http://liu.diva-portal.org/smash/get/diva2:761904/FULLTEXT01.pdf, 2014, 101 pages.
Pishehvari, et al., "Radar Scan Matching Using Navigation Maps", Feb. 2019, 8 pages.
Poggenhans, et al., "Precise Localization in High-Definition Road Maps for Urban Regions", Oct. 2018, 8 pages.
Saarinen, et al., "Normal Distributions Transform Occupancy Maps: Application to Large-Scale Online 3D Mapping", May 2013, pp. 2233-2238.
Schoen, et al., "Real-Time Radar SLAM", Jan. 2017, 10 pages.
Ward, et al., "Vehicle localization with low cost radar sensors", Jun. 2016, 8 pages.
Non-Final Office Action regarding U.S. Appl. No. 17/367,295, dated Nov. 8, 2023.
Non-Final Office Action regarding U.S. Appl. No. 17/367,303, dated Nov. 27, 2023.
"Extended European Search Report", European Application No. 23162302.6, Sep. 18, 2023, 13 pages.
"Extended European Search Report", EP Application No. 20193680.4, Feb. 18, 2021, 9 pages.
Bouzouraa, "Fusion of Occupancy Grid Mapping and Model Based Object Tracking for Driver Assistance Systems using Laser and Radar Sensors", Jun. 2010, pp. 294-300.
Guidolini, et al., "Removing Movable Objects from Grid Maps of Self-Driving Cars Using Deep Neural Networks", Jul. 2019, 8 pages.
Sahdev, "Free Space Estimation Using Occupancy Grids and Dynamic Object Detection", Aug. 2017, 10 pages.
"Atari 1040 ST Bedienungshandbuch", Jan. 1, 1987, 95 pages.
"Extended European Search Report", EP Application No. 21209134.2, May 12, 2022, 10 pages.
"Extended European Search Report", EP Application No. 21209674.7, May 13, 2022, X pages.
"Smart Summon", Tesla Model 3 Owner's Manual, Retrieved from https://www.tesla.com/ownersmanual/model3/en_nz/GUID-6B9A1AEA-579C-400E-A7A6-E4916BCD5DED.html on Mar. 7, 2022, 6 pages.
Almalioglu, et al., "Milli-RIO: Ego-Motion Estimation with Low-Cost Millimetre-Wave Radar", Mar. 6, 2020, 9 pages.
Bruns, "Lidar-based Vehicle Localization in an Autonomous Valet Parking Scenario", Thesis, The Ohio State University, 2016, 57 pages.
Einsiedler, et al., "Vehicle Indoor Positioning: A Survey", Oct. 2017, 6 pages.
Hanke, et al., "Virtual Sensorics: Simulated Environmental Perception for Automated Driving Systems", Jul. 9, 2020, 119 pages.
Klemm, et al., "Autonomous Multi-Story Navigation for Valet Parking", 2016 IEEE 19th International Conference on Intelligent Transportation Systems (ITSC), 2016, 8 pages.

(56) References Cited

OTHER PUBLICATIONS

Li, et al., "Extracting General-Purpose Features from LiDAR Data", 2010 IEEE International Conference on Robotics and Automation, May 3, 2010, 6 pages.
Markiewicz, et al., "Developing Occupancy Grid with Automotive Simulation Environment", Oct. 29, 2020, 16 pages.
Pishehvari, et al., "Radar Scan Matching Using Navigation Maps", Feb. 25, 2019, pp. 204-211.
Qin, et al., "AVP-SLAM: Semantic Visual Mapping and Localization for Autonomous Vehicles in the Parking Lot", 2020 IEEE/RSJ International Conference on Intelligent Robots and Systems (IROS), Oct. 2020, pp. 5939-5945.
Schuster, et al., "Robust Localization based on Radar Signal Clustering", Jun. 19, 2016, pp. 839-844.
Song, et al., "Floorplan-based Localization and Map Update Using LiDAR Sensor", 2021 18th International Conference on Ubiquitous Robots (UR), Jul. 2021, pp. 30-34.
Varjotie, et al., "Accuracy analysis of scan registration in Normal Distributions Transform based simultaneous localization and mapping using radar and laser scanning", Jun. 26, 2019, 71 pages.
Ward, et al., "Vehicle Localization with Low Cost Radar Sensors", Jun. 19, 2016, pp. 864-870.
Zhu, et al., "Reference Map Generation Techniques for Radar Scene Matching Guidance: An Overview", Mar. 1, 2009, 4 pages.
"Extended European Search Report", EP Application No. 21210140.6, Aug. 22, 2022, 12 pages.
"Extended European Search Report", EP Application No. 21210142.2, Aug. 23, 2022, 11 pages.
"Partial European Search Report", EP Application No. 21210140.6, May 20, 2022, 16 pages.
"Partial European Search Report", EP Application No. 21210142.2, May 23, 2022, 13 pages.
"Sinclair ZX81 Personal Computer", Retrieved from: https://www.zock.com/8-Bit/D_ZX81.HTML, Jan. 1, 1983, 4 pages.
Mahmoud, et al., "Parking Map Generation and Tracking Using Radar—Adaptive Inverse Sensor Model", Jun. 29, 2020, 71 pages.

* cited by examiner

VEHICLE LOCALIZATION BASED ON RADAR DETECTIONS

CROSS-REFERENCE TO RELATED APPLICATIONS

This application claims the benefit under 35 U.S.C. 119(e) of U.S. Provisional Application No. 63/146,483, filed Feb. 5, 2021, and U.S. Provisional Application No. 63/127,049, filed Dec. 17, 2020, the disclosures of which are incorporated by reference in their entireties herein.

BACKGROUND

Vehicle localization is a technique of using sensor data to localize a vehicle to a map (e.g., determining a location of the vehicle on the map). Vehicle localization may be used to support autonomous vehicle operations (e.g., navigation, path planning, lane determination and centering, and curve execution without lane markers). In order to accurately position the vehicle relative to its environment, vehicle localization includes obtaining the position, from various sensors and navigation systems onboard the vehicle, of stationary localization objects (e.g., signs, poles, barriers) and relating these positions with known locations on the map (e.g., locations in a Universal Transverse Mercator or UTM frame). The location, or pose, of the vehicle may be determined in relation to these objects.

Some autonomous vehicles perform driving operations, which depend on a localization accuracy that is near the sub-meter accuracy level. The sub-meter accuracy level may be achieved with expensive sensors and navigation systems, including optical cameras, light detection based ranging systems (e.g., LiDAR), and high-quality global navigation satellite systems (GNSS) receivers. However, cameras and LiDAR may have reduced performance when operating in less-than-ideal lighting and weather conditions. High-quality GNSS systems may be too expensive for most consumer vehicles, which instead may be integrated with less capable global positioning capabilities.

SUMMARY

Aspects described below include methods of vehicle localization based on radar detections. The methods include receiving, by at least one processor, radar detections from one or more radar sensors of the vehicle. The methods further include receiving, by at least one processor, navigation data from one or more navigation units of the vehicle. The methods further include outputting, by the at least one processor, ego-trajectory information about a current dynamic state of the vehicle. The methods further include extracting, by the at least one processor and from the radar detections and the ego-trajectory information, landmark data. The methods also include determining, by the at least one processor and from the extracted landmark data and a radar reference map, a normal distribution transformation grid. The methods also include, responsive to determining the normal distribution transformation grid, correcting, by the at least one processor, a vehicle pose according to the normal distribution transformation grid to localize the vehicle.

Aspects described below also include systems for implementing vehicle localization based on radar detections. The systems include at least one processor and at least one computer-readable storage medium comprising instructions that, when executed by the processor, cause the systems to receive radar detections from one or more radar sensors. The instructions also cause the systems to receive navigation data from one or more navigation units. The instructions further cause the systems to output ego-trajectory information about a current dynamic state of the vehicle. The instructions further cause the systems to extract, from the radar detections and the ego-trajectory information, landmark data. The instructions further cause the systems to determine a normal distribution transformation grid from the extracted landmark data and a radar reference map. The instructions further cause the systems to be responsive to determining the normal distribution transformation grid, correct a vehicle pose according to the normal distribution transformation grid to localize the vehicle.

BRIEF DESCRIPTION OF THE DRAWINGS

Systems and techniques enabling vehicle localization based on radar detections are described with reference to the following drawings. The same numbers are used throughout the drawings to reference like features and components:

FIG. 2-1 is an example illustration of systems that may be used to implement vehicle localization based on radar detections, in accordance with techniques of this disclosure;

FIG. 2-2 is an example illustration of a radar-localization module that may be used to implement vehicle localization based on radar detections;

FIG. 2-3 is another example illustration of a radar-localization module that may be used to implement vehicle localization based on radar detections;

FIG. 3 is an example illustration of generating a radar reference map, in accordance with techniques of this disclosure;

FIGS. 20-1 to 20-3 illustrate an example implementation of hindsight used to update, through multiple iterations, a radar reference map used for vehicle localization based on radar detections, in accordance with techniques of this disclosure;

FIGS. 22-1 to 22-2 illustrate a flow chart of an example of a process for vehicle localization based on radar detections, in accordance with techniques of this disclosure.

DETAILED DESCRIPTION

Overview

This document describes methods and systems for vehicle localization based on radar detections. Radar localization starts with building a radar reference map. The radar reference map may be generated and updated using different techniques as described herein. Once a radar reference map is available, real-time localization may be achieved with inexpensive radar sensors and navigation systems. Using the techniques described in this document, the data from the radar sensors and the navigation systems may be processed to identify stationary localization objects, or landmarks, in the vicinity of the vehicle. Comparing the landmark data originating from the onboard sensors and systems of the vehicle with landmark data detailed in the radar reference map may generate an accurate pose of the vehicle in its environment. By using inexpensive radar systems and lower quality navigation systems, a highly accurate vehicle pose may be obtained in a cost-effective manner.

Example Environment

Figure 1:
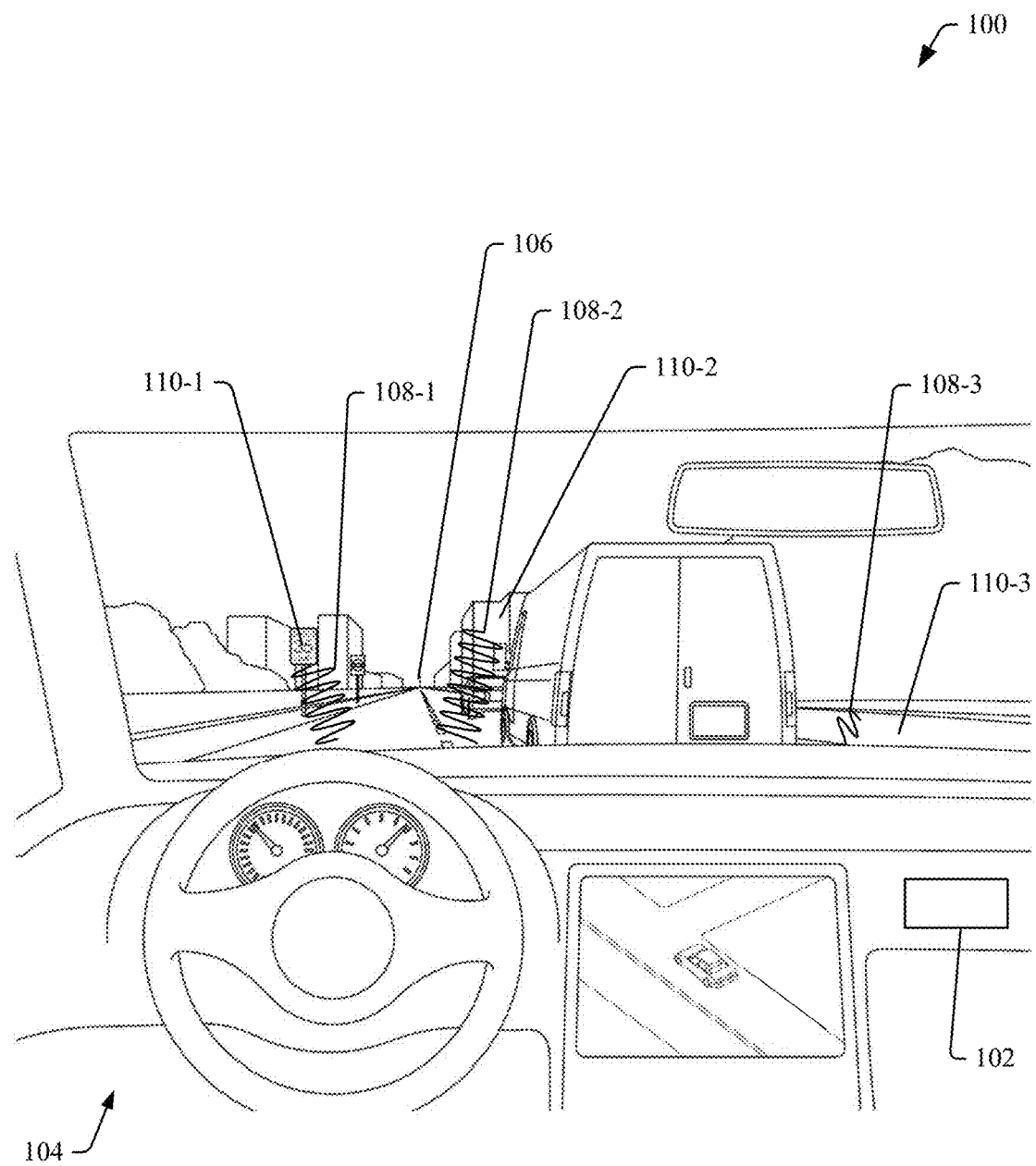
FIG. 1 is an example illustration of an environment in which vehicle localization based on radar detections may be implemented, in accordance with techniques of this disclosure.

FIG. 1 is an example illustration 100 of an environment in which radar reference maps may be generated, updated, or used. In the example illustration 100, a system 102 is disposed in a vehicle 104 (e.g., an ego-vehicle) that is traveling along a roadway 106.

The system 102 utilizes a radar system (not shown) to transmit radar signals (not shown). The radar system receives radar reflections 108 (radar detections) of the radar signals from objects 110. In example illustration 100, the radar reflection 108-1 corresponds to object 110-1 (e.g., a sign), the radar reflection 108-2 corresponds to object 110-2 (e.g., a building), and the radar reflection 108-3 corresponds to object 110-3 (e.g., a guardrail).

The radar reflections 108 may be used to generate a radar reference map, as discussed in reference to FIGS. 3 to 13. The radar reflections 108 may also be used to update an existing radar reference map, as discussed in reference to FIGS. 17 to 21. The radar reflections 108 may further be used in conjunction with an existing radar reference map to radar-localize the vehicle 104, as discussed in reference to FIGS. 22-1 to 23.

Example Systems

Figures 1, 2:
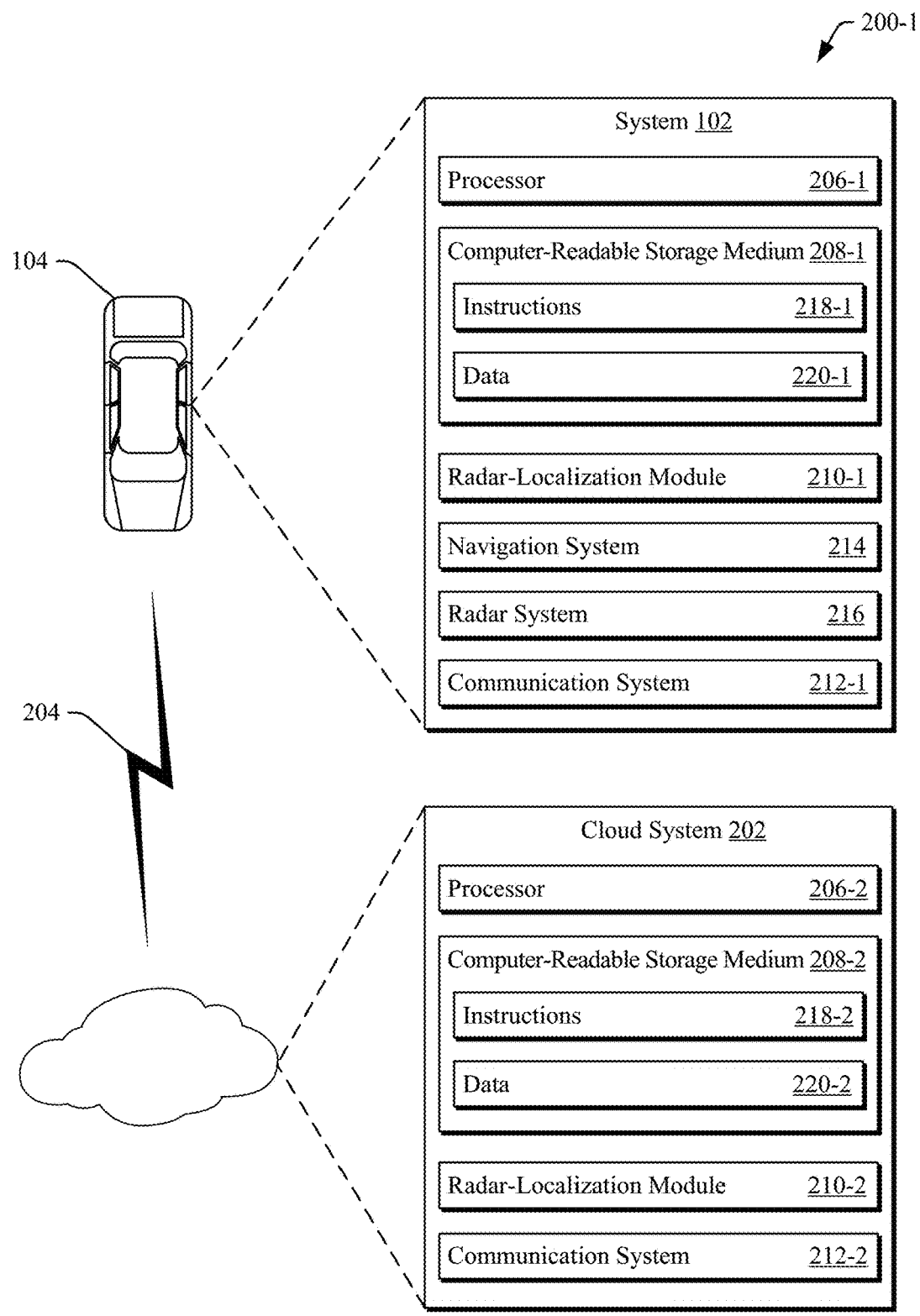
Figure 2:
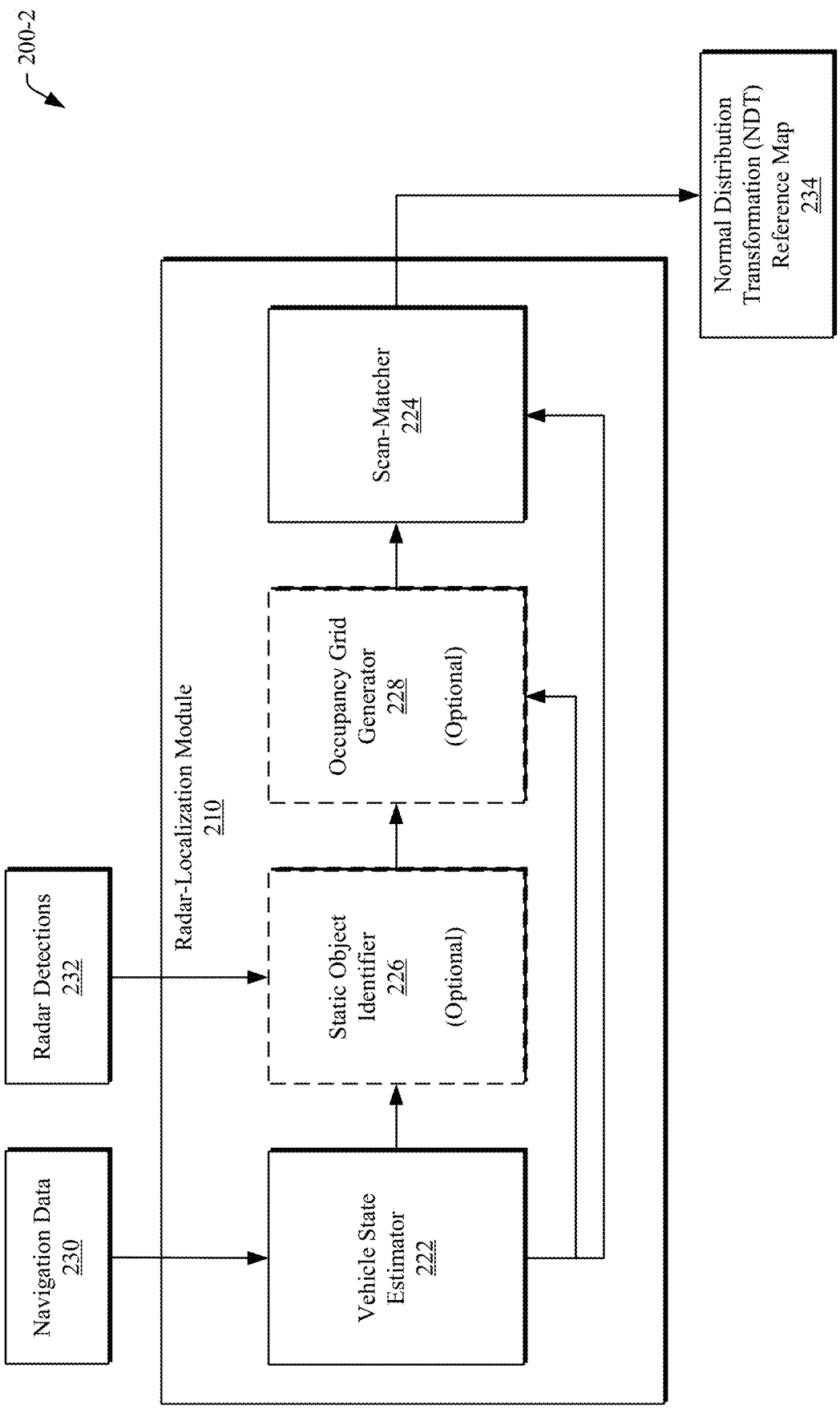

FIG. 2-1 is an example illustration 200-1 of systems that may be used to generate, update, or use radar reference maps. The example illustration 200-1 comprises the system 102 of the vehicle 104 and a cloud system 202. Although the vehicle 104 is illustrated as a car, the vehicle 104 may comprise any vehicle (e.g., a truck, a bus, a boat, a plane, etc.) without departing from the scope of this disclosure. The system 102 and the cloud system 202 may be connected via communication link 204. One or both of the system 102 and the cloud system 202 may be used to perform the techniques described herein.

As shown underneath the respective systems, the systems include at least one processor 206 each (e.g., processor 206-1 and processor 206-2), at least one computer-readable storage medium 208 each (e.g., computer-readable storage medium 208-1 and 208-2), radar-localization modules 210 (e.g., radar-localization module 210-1 and 210-2), and communication systems 212 (e.g., communication system 212-1 and 212-2). The communication systems 212 facilitate the communication link 204.

The system 102 additionally contains a navigation system 214 and a radar system 216. The navigation system 214 may include a geospatial positioning system (e.g., a GPS, GNSS, or GLONASS sensor), an inertial measurement system (e.g., a gyroscope or accelerometer), or other sensors (e.g., a magnetometer, software positioning engine, wheel tick sensor, lidar odometer, vision odometer, radar odometer, or other sensor odometer). The navigation system 214 may provide high-accuracy location data (e.g., to within a meter) or low-accuracy location data (e.g., to within a couple meters). The radar system 216 is indicative of a radar hardware used to transmit and receive radar signals (e.g., radar reflections 108). In some implementations, the radar system 216 provides static detections to the radar-localization modules 210 (e.g., filtering may be performed within the radar system 216).

The processors 206 (e.g., application processors, microprocessors, digital-signal processors (DSP), or controllers) execute instructions 218 (e.g., instructions 218-1 and 218-2) stored within the computer-readable storage media 208 (e.g., non-transitory storage devices such as hard drives, SSD, flash memories, read-only memories (ROM), EPROM, or EEPROM) to cause the system 102 and cloud system 202 to perform the techniques described herein. The instructions 218 may be part of operating systems and/or one or more applications of the system 102 and cloud system 202.

The instructions 218 cause the system 102 and the cloud system 202 to act upon (e.g., create, receive, modify, delete, transmit, or display) data 220 (e.g., 220-1 and 220-2). The data 220 may comprise application data, module data, sensor data, or I/O data. Although shown within the computer-readable storage media 208, portions of the data 220 may be within random-access memories (RAM) or caches of the system 102 and the cloud system 202 (not shown). Furthermore, the instructions 218 and/or the data 220 may be remote to the system 102 and the cloud system 202.

The radar-localization modules 210 (or portions thereof) may be comprised by the computer-readable storage media 208 or be stand-alone components (e.g., executed in dedicated hardware in communication with the processors 206 and computer-readable storage media 208). For example, the instructions 218 may cause the processors 206 to implement or otherwise cause the system 102 or the cloud system 202 to implement the techniques described herein.

FIG. 2-2 is an example illustration 200-2 of the radar-localization module 210 that may be used to implement vehicle localization based on radar detections. In the example illustration 200-2, the radar-localization module 210 is configured to be in a reference mode. The reference mode is used when the radar-localization module 210 is being used to build a radar reference map. The radar-localization module 210 includes two sub-modules, a vehicle state estimator 222, a scan-matcher 224, and two optional sub-modules, a static object identifier 226, and an occupancy grid generator 228. One or both of the static object identifier 226 and the occupancy grid generator 228 may or may not be present.

The vehicle state estimator 222 receives navigation data 230 from navigation systems (e.g., the navigation system 214 from FIG. 2-1). Generally, in the reference mode, the navigation data 230 may be sourced from a high-quality navigation system that provides a higher degree of accuracy than commercial or consumer-grade navigation systems (e.g., navigation systems used for mass production). From the navigation data 230, the vehicle state estimator 222 determines ego-trajectory information about the current dynamic state (e.g., speed, yaw rate) of the vehicle 104 and may provide the state estimates and other navigation data 230 (e.g., latitude and longitude of the vehicle 104) to any of the other sub-modules that are present in the radar-localization module 210. Ego-trajectory information includes information, originating from systems of a vehicle, that may be used to project the direction and velocity of the vehicle.

The static object identifier 226 receives radar detections 232 from one or more radar sensors positions around the vehicle 104. If the static object identifier 226 is not being utilized, then the radar detections 232 may be received by the occupancy grid generator 228, the scan-matcher 224, or another sub-module designed to accept the radar detections 232 and distribute the radar data to other modules and sub-modules of the vehicle system. The static object identifier 226 determines whether a radar detection 232 is a static detection based on the ego-trajectory information from the vehicle state estimator 222 and outputs any identified static detections to either the occupancy grid generator 228, if it is being utilized, or the scan-matcher 224.

The occupancy grid generator 228 may receive, as inputs, either the radar detections 232, if the static object identifier 226 is not being utilized by the radar-localization module 210, or the static radar detections output by the static object identifier 226, as well as, the ego-trajectory information and the navigation data 230 output from the vehicle state estimator 222. The occupancy grid generator 228 uses the inputs to determine a statistical probability (e.g., occupancy grid) of the occupancy at any given location in the environment of the vehicle 104, as discussed in other sections of this document.

The scan-matcher 224 may receive, as input, the ego-trajectory information and landmark data. Landmark data may be either the radar detections 232, the static radar detections from the static object identifier 226, or the occupancy grid that is output by the occupancy grid generator 228, depending on which optional sub-modules are being utilized. As described in other sections of this document, the scan-matcher 224 finds an optimal normal distribution transformation (NDT) between the landmark data and the high-quality navigation data 230 and outputs an NDT radar reference map 234.

Figures 2, 3:
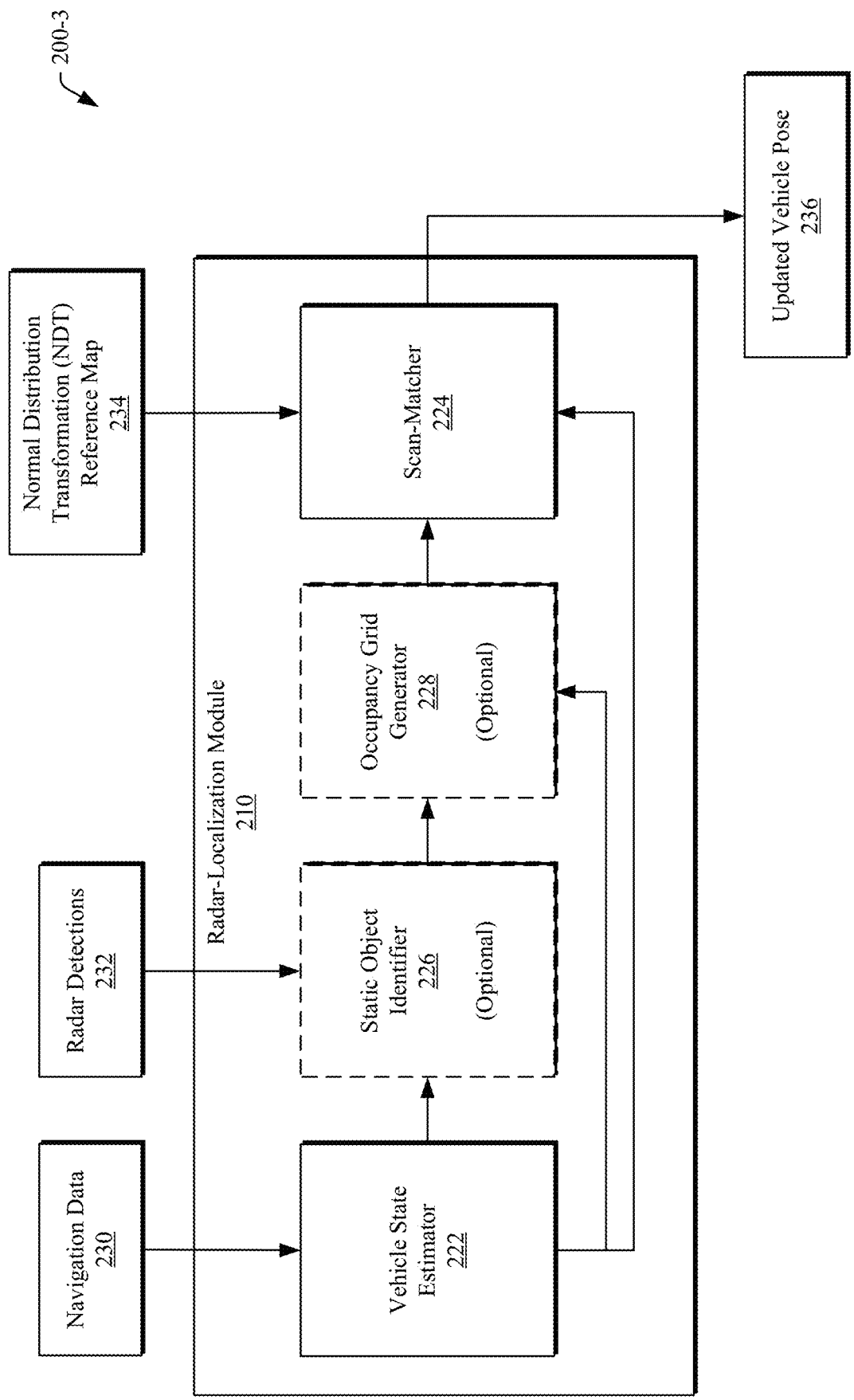
Figure 3:
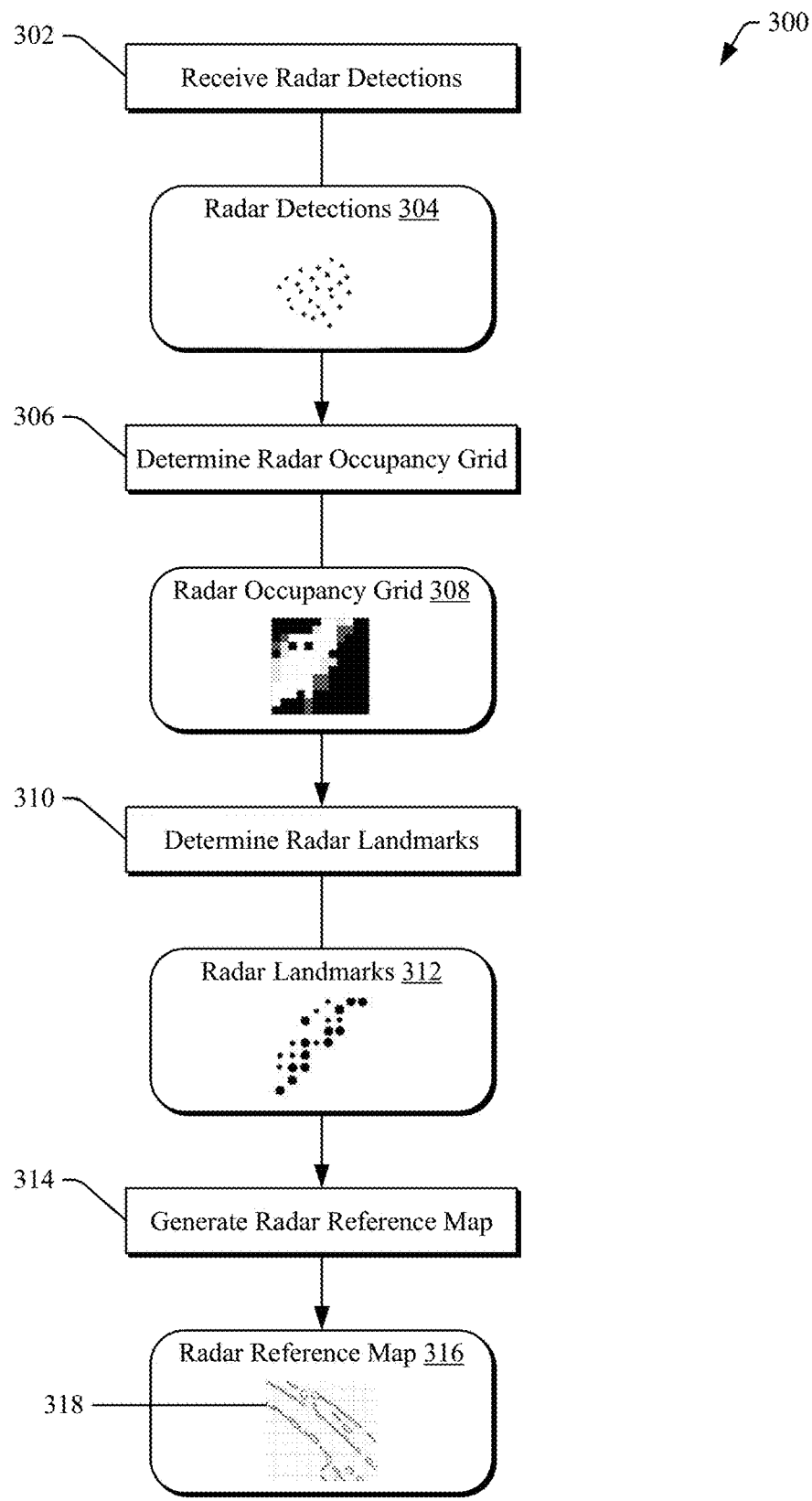

FIG. 2-3 is another example illustration 200-3 of a radar-localization module that may be used to implement vehicle localization based on radar detections. In the example illustration 200-3, the radar-localization module 210 is configured to be in a real-time localization mode. The primary differences between the real-time localization mode and the reference mode of the radar-localization module 210 include the navigation data 230 originating from a lower-quality navigation system and an extra input to the scan-matcher module 224. The output of the radar-localization module 210 in real-time localization mode is an updated vehicle pose 236 of the vehicle 104.

In real-time localization mode, the scan-matcher 224 receives the NDT radar reference map 234 as input, in addition to the landmark data and the ego-trajectory information. The inputs are used by the scan-matcher to determine an NDT grid. The NDT grid is compared to the NDT radar reference map to determine the updated vehicle pose 236.

In one non-limiting example, the radar-localization module 210 may be used in the reference mode in the vehicle 104, equipped with a high-quality GNSS system, that is specially configured to create or assist in the creation of NDT radar reference maps. The real-time localization mode may be considered a normal operating mode of the radar-localization module 210; that is, vehicles not specially configured to create the NDT radar reference maps may normally operate with the radar-localization module 210 in the real-time localization mode.

Building a Radar Reference Map

FIG. 3 is an example illustration 300 of generating a radar reference map from radar detections. Example illustration 300 may be performed by the system 102 and/or the cloud system 202. At 302, radar detections 304 are received. The radar detections 304 comprise stationary radar detections (e.g., detections of stationary objects from radar system 216 including signs, poles, barriers, landmarks, buildings, overpasses, curbs, road-adjacent objects such as fences, trees, flora, foliage, or spatial statistical patterns) with corresponding global coordinates for respective times/locations (e.g., from navigation system 214). The global coordinates may comprise high-accuracy location data (e.g., when the navigation system 214 is a high-accuracy navigation system). The radar detections 304 may comprise point clouds, have corresponding uncertainties, and/or include various radar data or sensor measurements.

At 306, a radar occupancy grid 308 is determined from the radar detections 302. The radar occupancy grid 308 is a grid-based representation of an environment. For example, the radar occupancy grid 308 may be a Bayesian, Dempster Shafer, or other type of occupancy grid. Each cell of the radar occupancy grid 308 represents an independent portion of space, and each cell value of the radar occupancy grid 308 represents a probability (e.g., 0-100%) that the corresponding portion of space is occupied. A probability of around 0% for a cell may indicate that the corresponding portion of space is free, while a probability closer to 100% may indicate that the corresponding portion of space is occupied, and therefore, not free space. Techniques of determining the radar occupancy grid 308 are discussed further in regard to FIGS. 4, 7-9, and 14-17.

At 310, radar landmarks 312 are determined from the radar occupancy grid 308. The radar landmarks 312 are center coordinates of respective groups of cells of the radar occupancy grid 308 with probabilities greater than a threshold. The radar landmarks 312 comprise clusters, contours, or bounding boxes of the cells of the radar occupancy grid 308. The radar landmarks 312 have weights based on one or more of probabilities, classifications, or cross-section values of the respective radar landmarks 312. The radar landmarks 312 may be determined using binarization, a clustering algorithm, or machine learning on the radar occupancy grid 308. The determination of the radar landmarks 312 generally applies a threshold value to the radar occupancy grid 308 and removes any noise from the radar occupancy grid 308.

At 314, a radar reference map 316 is generated from the radar landmarks 312. The radar reference map 316 may be a statistical reference map, e.g., a Gaussian representation. The radar reference map 316 is a collection of Gaussians 318 corresponding to occupied areas. The Gaussians 318 (or the cells of the radar reference map 316) have associated location information (e.g., low or high-quality location information depending on how the radar reference map 316 is generated). Each cell of the radar reference map 316 can have a single Gaussian 318 or be blank. Although not required, the radar reference map 316 has cells that are larger than the cells of the radar occupancy grid 308. The radar reference map 316 can be a stand-alone map or a layer in another map (e.g., a layer in a high-definition (HD) map).

The radar reference map 316 may contain metadata associated with the respective Gaussians 318. For example, the metadata may contain information about shapes or dimensions of clusters of Gaussians 318. The metadata may also include object associations, e.g., certain Gaussians 318 belong to a sign or guardrail. The location data may also be contained within the metadata. Techniques of generating the radar reference map 316 are discussed further in regard to FIGS. 5, 6, and 10-13.

Figure 4:
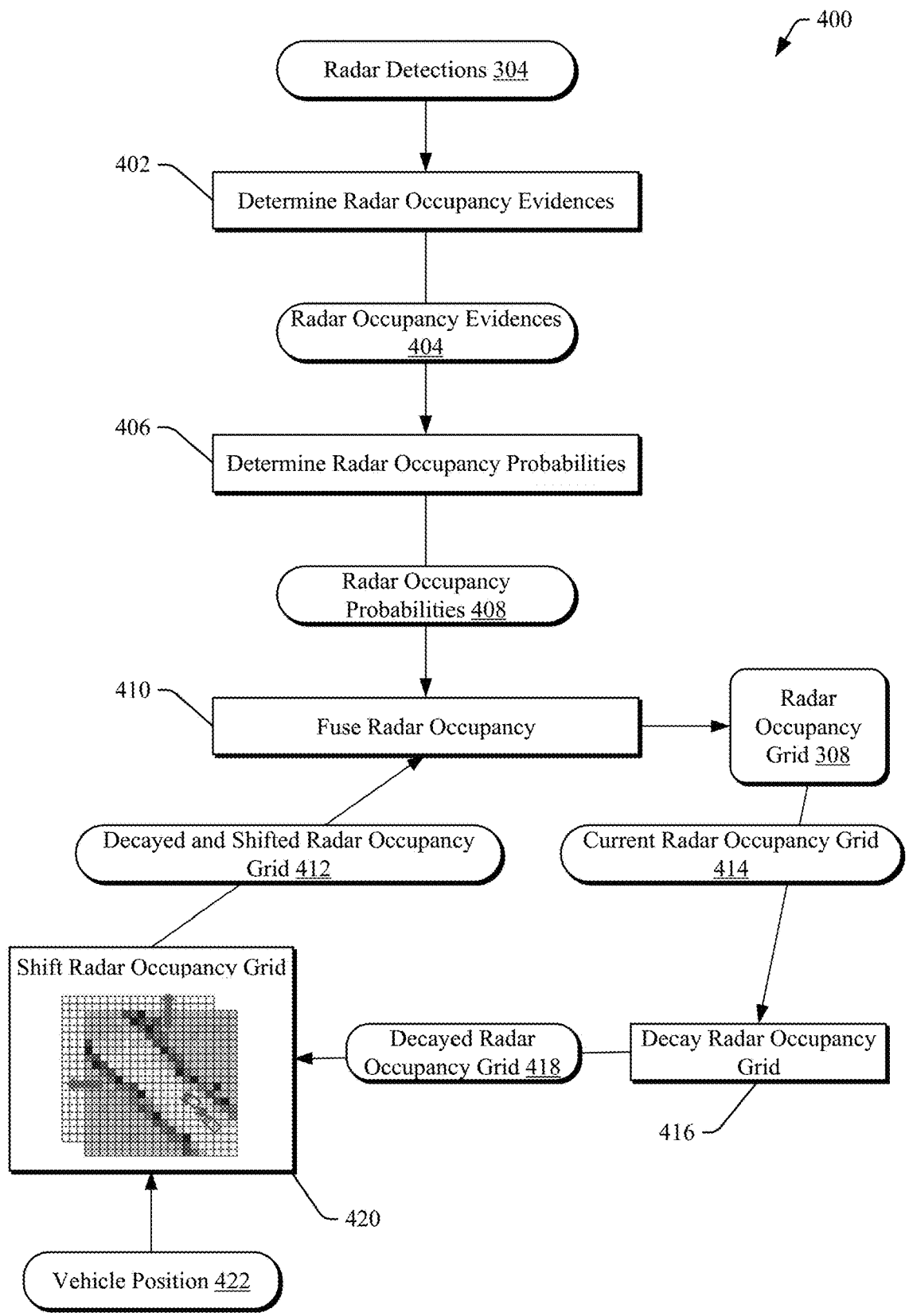
FIG. 4 is an example illustration of determining a radar occupancy grid, in accordance with techniques of this disclosure.

FIG. 4 is an example illustration 400 of determining the radar occupancy grid 308 from the radar detections 304. Example illustration 400 is generally performed by the system 102, although portions or all of example illustration 400 may be performed by the cloud system 202. Example illustration 400 assumes that the location data associated with the radar detections 304 is high-accuracy location data (e.g., the navigation system 214 contains a high-accuracy GNSS).

At 402, one set (e.g., time) of the radar detections 304 is received (e.g., a radar detection 304 corresponding to a zero-point), and radar occupancy evidences 404 are determined from the one set of radar detections 304. The radar occupancy evidences 404 correspond to respective cells of the radar occupancy grid 308 and are indicative of occupied spaces within the radar occupancy grid 308. The radar occupancy evidences 404 are based on radar reflections 108 corresponding to the one set of radar detections 304 and associated range and azimuth uncertainties.

At 406, radar occupancy probabilities 408 are determined from the radar occupancy evidences 404. For example, the radar occupancy probabilities 408 may be given by Equation 1:

$$p = 0.5 + 0.5 \cdot e \quad [1]$$

where p is a radar occupancy probability 408 and e is an occupancy evidence 404.

Steps 402 and 406 may be repeated for other sets of radar detections 304 corresponding to later times/locations. For each of the later times/locations, the radar occupancy probabilities 408 are fused, at 410, with a decayed and shifted radar occupancy grid 412. The decayed and shifted radar occupancy grid 412 represents a current radar occupancy grid 414 (e.g., the radar occupancy grid 308 at the current time/location) with decayed probabilities and cells that have been shifted due to a movement of the vehicle between the previous time/location and current ones. The fusing is used to update (e.g., append) the radar occupancy grid 308 based on subsequent radar detections 304 corresponding to the later times/locations.

In order to generate the decayed and shifted radar occupancy grid 412, at 416, the current radar occupancy grid 414 (e.g., at the respective location) is decayed to form a decayed radar occupancy grid 418. The decay comprises forgetting, minimizing, or otherwise removing old evidence from the current radar occupancy grid 414. This ensures that only recently generated cells are used for the fusing. It should be noted that the radar occupancy grid 308 is not decayed; rather, the current radar occupancy grid 414, which is a snapshot of the radar occupancy grid 308, is decayed.

The decayed radar occupancy grid 418 is then shifted, at 420, to form the decayed and shifted radar occupancy grid 412. Each cell of the radar occupancy grid 308 (and the current radar occupancy grid 414) represents an area. As such, as the vehicle 104 moves, the grid must be shifted. To shift the grid, a vehicle position 422 at the time of the shift/decay is received. The decayed radar occupancy grid 418 is shifted by integer numbers of cells that correspond to the vehicle position 422. For example, the integer numbers may be based on a change between a vehicle position 422 that corresponds to the unshifted occupancy grid (e.g., the decayed radar occupancy grid 418 and the current radar occupancy grid 414) and the vehicle position 422.

As stated above, the decayed and shifted radar occupancy grid 412 is fused, at 410, with the radar occupancy probabilities 408 of the current set of radar detections 304. The fusion effectively accumulates radar occupancy probabilities 408 over time to enable the radar occupancy grid 308 to be more robust. Any fusion method may be used. For example, a Bayesian fusion method may be used according to Equation 2:

$$p_{new} = \frac{p_{old} \cdot p_{measured}}{(p_{old} \cdot p_{measured}) + (1 - p_{old}) \cdot (1 - p_{measured})} \quad [2]$$

where $p_{new}$ is an occupancy probability for a respective cell (e.g., in the radar occupancy grid 308), $p_{old}$ is an existing radar occupancy probability for the respective cell (e.g., in the decayed and shifted radar occupancy grid 412), and $p_{measured}$ is a radar occupancy probability 408 for the respective cell.

By using the example illustration 400, radar occupancy probabilities 408 from multiple times/locations may be fused. In so doing, the radar occupancy grid 308 becomes accurate and robust for use in the example illustration 300.

Figure 5:
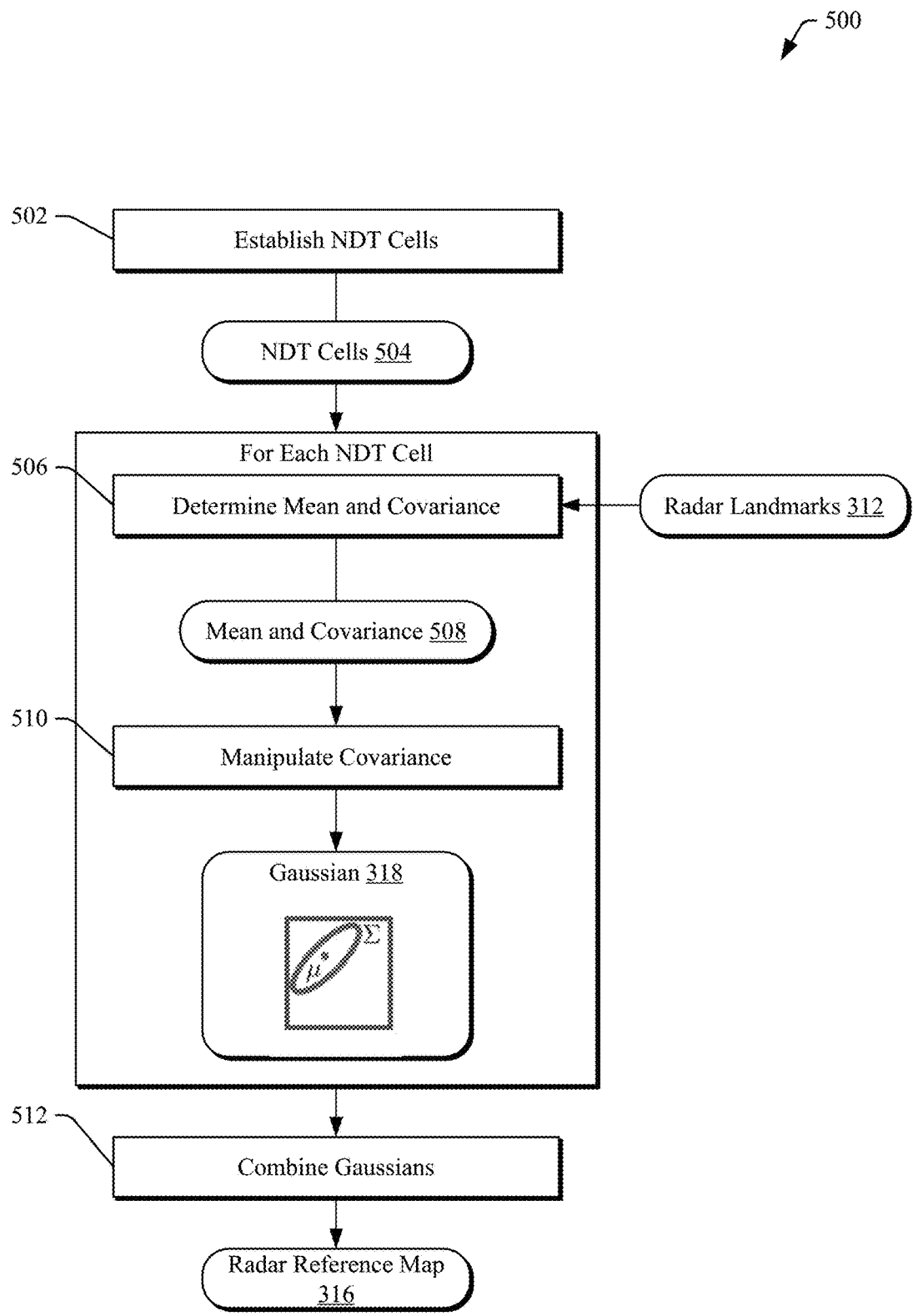
FIG. 5 is an example illustration of generating a radar reference map from radar landmarks, in accordance with techniques of this disclosure.

FIG. 5 is an example illustration 500 of determining the radar reference map 316 from the radar landmarks 312. At 502, NDT cells 504 are established. The NDT cells 504 are the cells of the radar reference map 316. The NDT cells 504 are generally much larger (e.g., 15 times larger) than the cells of the radar occupancy grid 308.

For each NDT cell 504 that has a plurality of radar landmarks 312, a Gaussian 318 (e.g., a multivariate distribution with a mean and covariance) is determined. In order to do so, at 506, a mean and covariance 508 are determined for the respective NDT cell 504. The mean and covariance 508 are based on radar landmarks 312 identified within the respective NDT cell 504. The mean for the respective NDT cell 504 may be determined based on Equation 3:

$$\mu_i = \Sigma_{j=1}^n p_j x_j \quad [3]$$

where $p_j$ is the occupancy probability of the radar occupancy grid 308 at a given cell of the radar occupancy grid 308, $x_j$ is the given cell position, and n is a number of cells within the radar landmarks 312 of the respective NDT cell 504.

The covariance (e.g., 2×2 matrix) for the respective NDT cell 504 may be determined based on Equation 4:

$$\Sigma_i = \Sigma_{j=1}^n p_j (x_j - \mu_i)(x_j - \mu_i)^T \quad [4]$$

Advantageously, the mean and covariance 508 are based on occupancy probability. At 510, the covariance for the respective NDT cell 504 may be manipulated such that the smallest eigenvalue of the covariance matrix is at least some multiple of the largest eigenvalue of the covariance matrix. The mean and covariance 508 (or a manipulated covariance if step 510 is performed) make up the Gaussian 318 for the respective NDT cell 504. If there are one or fewer radar landmarks 312 within the respective NDT cell 504, the respective NDT cell 504 is indicated as unoccupied.

Steps 506 and 510 can then be performed for others of the NDT cells 504. At 512, the Gaussians 318 for the respective NDT cells 504 are combined to form the radar reference map 316. Once combined, the NDT cells 504 of the radar reference map 316 may have a single Gaussian 318 or nothing (e.g., indicated as unoccupied).

Although steps 506 and 510 are discussed as being performed on a respective NDT cell 504 and then other NDT cells 504, in some implementations, step 506 may be performed on the NDT cells 504 as a group prior to performing step 510 on the group. For example, the mean and covariance 508 may be determined for each NDT cell 504 of a group. Then, the covariances may be manipulated, as needed, for each NDT cell 504 of the group.

Example Processes for Building Maps

Figure 6:
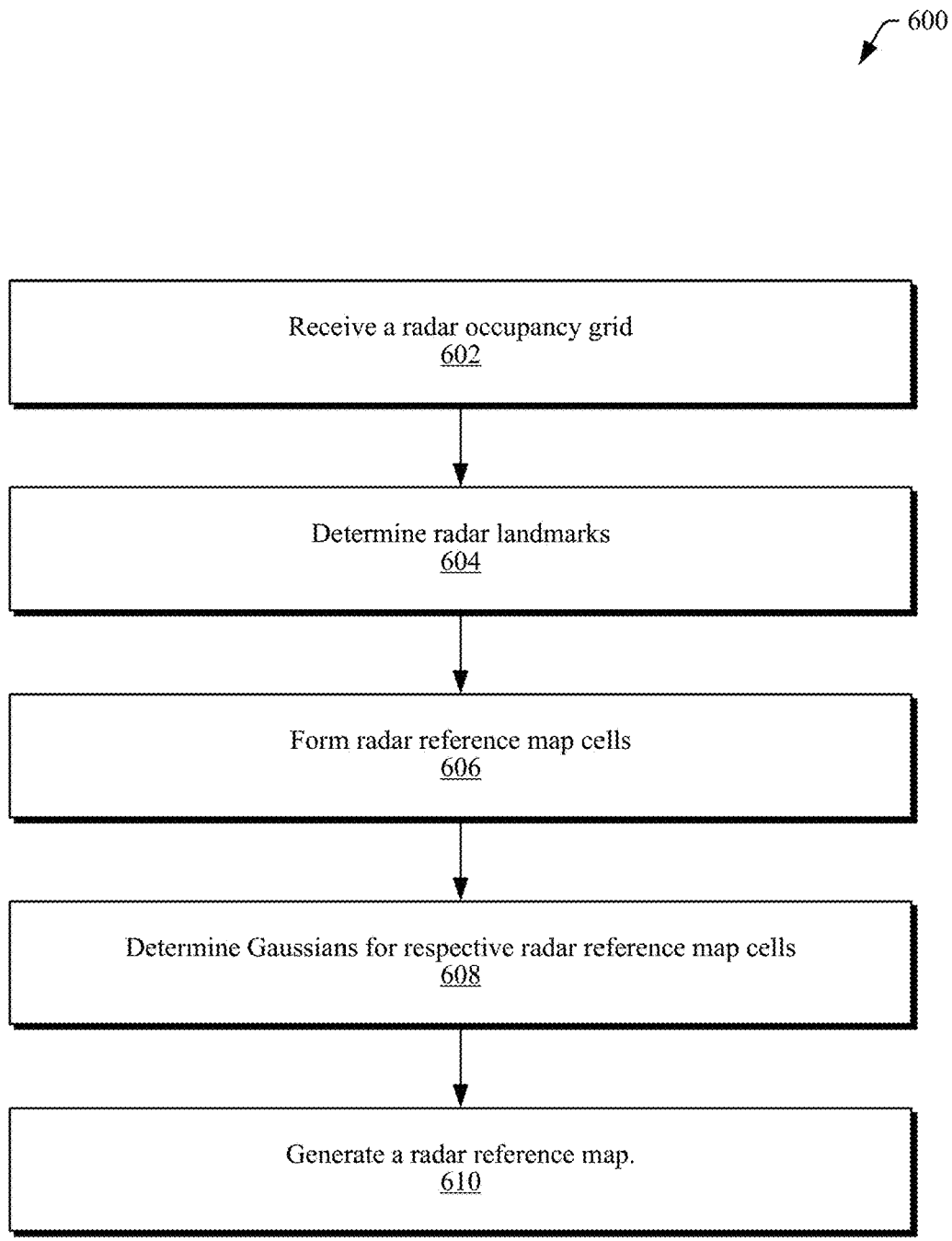
FIG. 6 is an example illustration of a process of generating a radar reference map, in accordance with techniques of this disclosure.

FIG. 6 is an example illustration 600 of a method of building the radar reference map 316. The example illustration 600 may be implemented utilizing the previously described examples, such as the example illustrations 100, 300, 400, and 500. Operations 602 through 610 may be performed by one or more entities of the system 102 and/or the cloud system 202 (e.g., the radar-localization module 210). The order in which the operations are shown and/or described is not intended to be construed as a limitation, and any number or combination of the operations can be combined in any order to implement the illustrated method or an alternate method.

At 602, a radar occupancy grid is received. For example, the radar-localization module 210 may receive the radar occupancy grid 308.

At 604, radar landmarks are determined from the radar occupancy grid. For example, the radar-localization module 210 may use thresholding on occupancy probabilities within the radar occupancy grid 308 to determine the radar landmarks 312. The radar landmarks 312 may comprise center coordinates of respective groups of cells of the radar occupancy grid that have occupancy probabilities above a threshold, or within a threshold range.

At 606, radar reference map cells are formed. For example, the radar-localization module 210 may create the NDT cells 504 of the radar reference map 316.

At 608, Gaussians are determined for radar reference map cells that contain a plurality of radar landmarks. For example, the radar-localization module 210 may determine the mean and covariance 508 for each of the NDT cells 504 that contain a plurality of radar landmarks 312.

At 610, a radar reference map is generated. The radar reference map comprises the radar reference map cells that include the Gaussians and radar reference map cells indicated as unoccupied. The radar reference map cells that are indicated as unoccupied correspond to radar reference map cells that do not contain a plurality of radar landmarks. For example, the radar-localization module 210 may combine the NDT cells 504 with Gaussians 318 and NDT cells 504 that are indicated as unoccupied to form the radar reference map 316.

Figure 7:
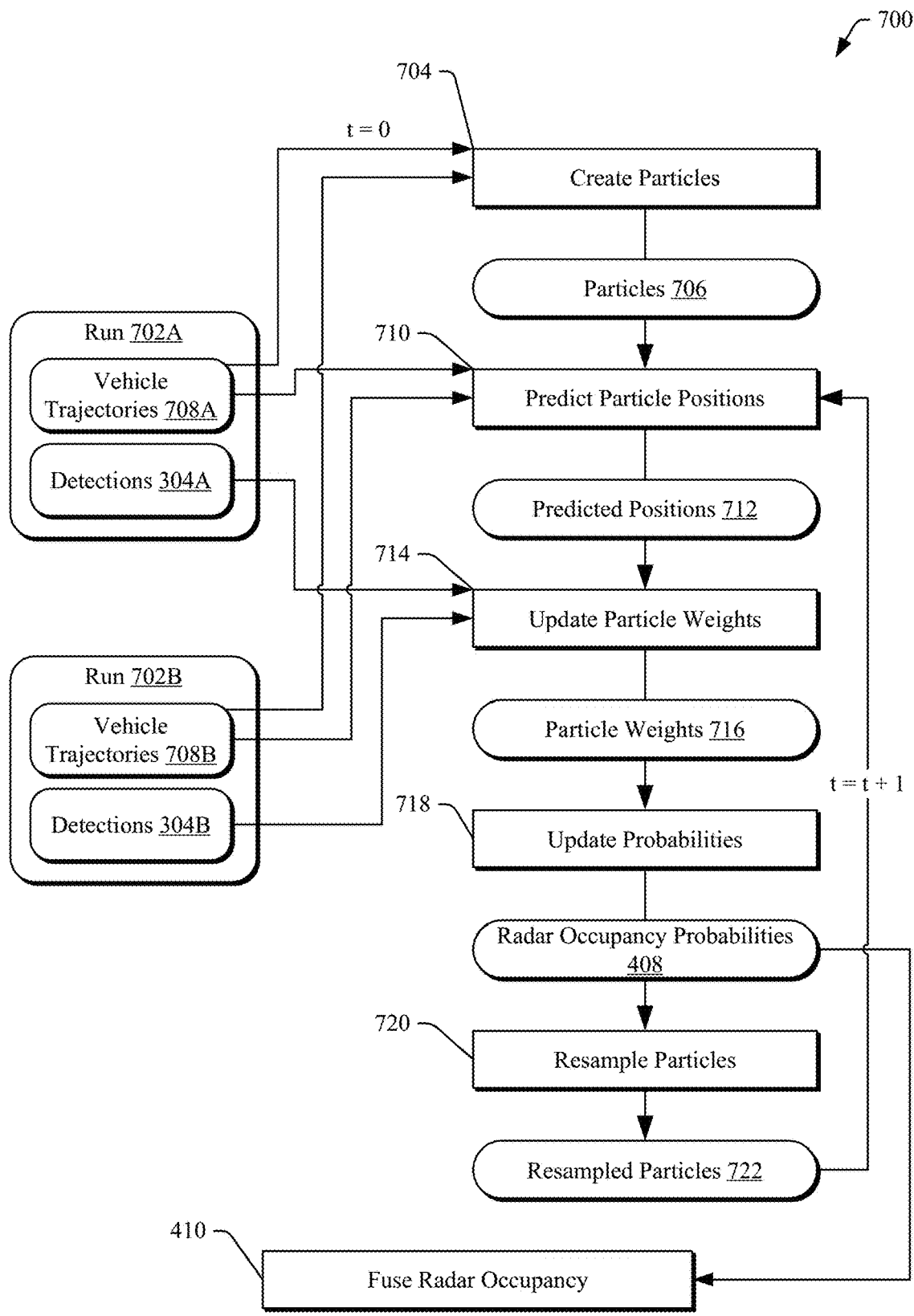
FIG. 7 is an example illustration of generating a radar occupancy grid based on multiple vehicle-runs with low-accuracy location data, in accordance with techniques of this disclosure.
Figure 8:
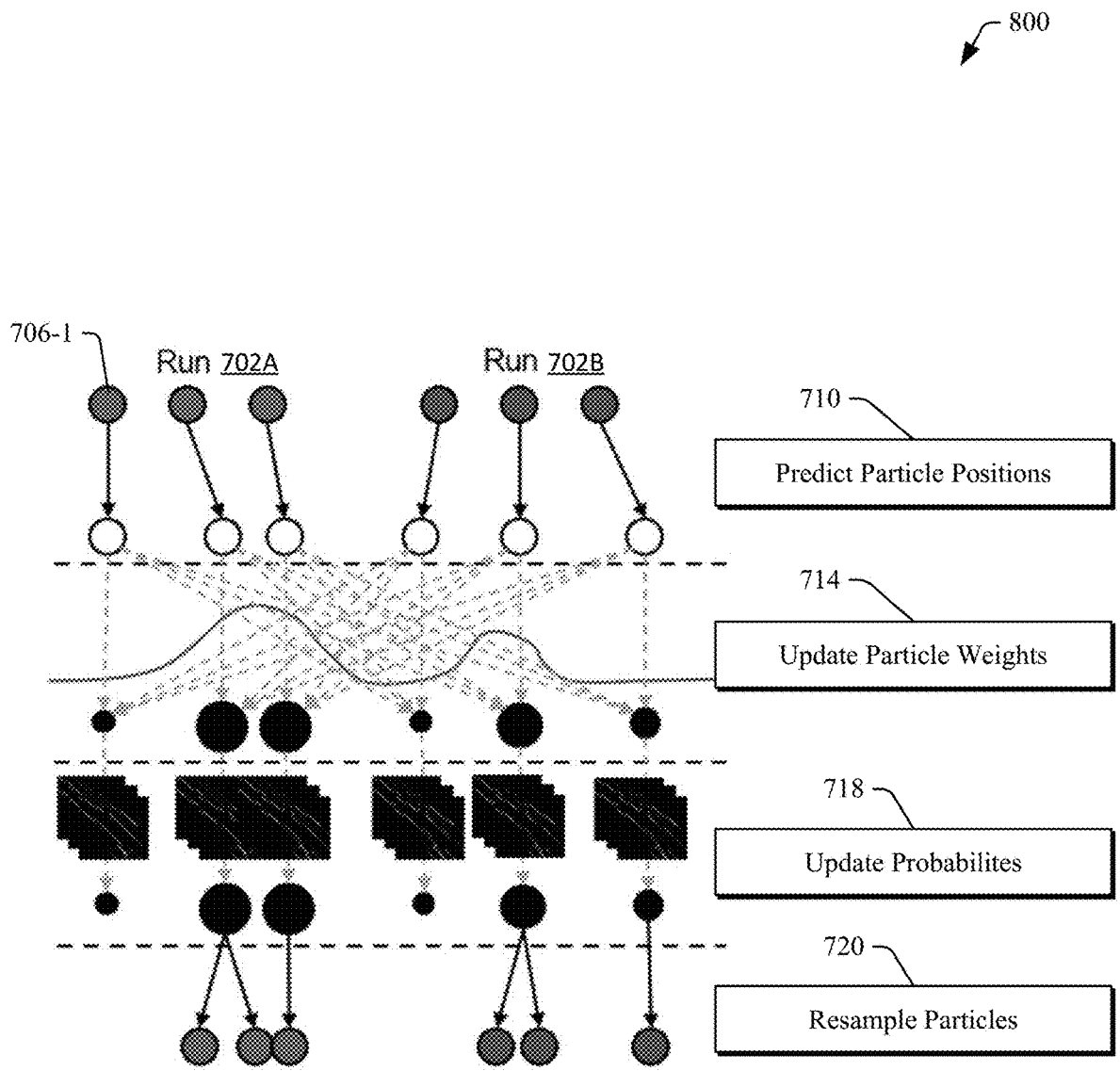
FIG. 8 is another example illustration of generating a radar occupancy grid based on multiple vehicle-runs with low-accuracy location data, in accordance with techniques of this disclosure.

FIG. 7 is an example illustration 700 of determining the radar occupancy probabilities 408 using multiple vehicle runs with low-accuracy location data. FIG. 8 is an example illustration 800 of a similar process. As such, the following description describes example illustrations 700 and 800 simultaneously. Example illustrations 700 and 800 are generally performed by the cloud system 202 based on radar detections 304 received from the multiple vehicle runs, although one or more of the steps may be performed by the system 102 (e.g., the gathering of the radar detections 304 and transmitting the radar detections 304 to the cloud system 202 using the communication system 212). The radar occupancy probabilities 408 may then be fused at 410 to create the radar occupancy grid 308. The radar reference map 316 may then be generated from the radar occupancy grid 308, similar to example illustrations 100 and 300.

Gathering high-accuracy location data is often impractical or expensive for large areas. Example illustrations 700 and 800 determine the radar occupancy probabilities 408 using multiple runs with low-accuracy location data, such as that generated by most navigation systems (e.g., navigation system 214) implemented within consumer and commercial vehicles. Because of the low-accuracy location data, multiple runs are needed to get occupancy probabilities 408 that are accurate. Conventional techniques, such as multiple run averaging, often lead to smeared and useless probability data.

Example illustrations 700 and 800 use a statistical map fusion of multiple runs 702 (e.g., run 702A and run 702B) to correct for the errors in the low-accuracy location data. Any number of runs 702 may be used (albeit more than one), and the runs 702 may be created using the same vehicle or multiple vehicles and at different times. The statistical map fusion may be an extended particle filter simultaneous localization and mapping (SLAM) algorithm.

At 704, particles 706 are created at a given location (e.g., at time t=0). The particles 706 correspond to respective possible future locations of the vehicle 104, although the specific further locations have not been determined yet. The particles 706 are based on vehicle trajectories 708 that correspond to the given location (e.g., from navigation system 214).

At 710, future positions of the particles are predicted to form predicted positions 712 (e.g., of the vehicle 104). The predictions are based on the vehicle trajectories 708. For example, the vehicle trajectories 708 may comprise speed and yaw rate information. The speed and yaw rates may be used to predict new poses for the respective runs 702 and thus, the predicted positions 712 of the particles 706.

At 714, particle weights 716 are updated. In order to do so, the particles 706 are projected onto the radar occupancy grid 308, where each particle 706 has corresponding grid cells. The sum of all of the probability values (e.g., from the multiple runs 702) in the corresponding grid cell is the weight of the particle 706. In other words, the weight of a particle 706 corresponds to how well a next radar detection 304 fits the predicted position 712.

At 718, existing probabilities are updated using the particle weights 716 to create the radar occupancy probabilities 408.

At 720, the particles are resampled to create resampled particles 722. Particles with high weights may be split, while particles with low weights may disappear. The resampled particles 722 become the particles at time t+1 for use in the position prediction (step 710). The resampled particles 722 may also be used to correct the vehicle trajectories 708.

As the time t is incremented, the radar occupancy probabilities 408 are updated, and the radar occupancy probabilities 408 are fused with previous radar occupancy probabilities per 410.

One advantage of example illustrations 700 and 800 is that they build the radar occupancy probabilities 408 using data from the runs 702 simultaneously. As such, each set of particles 706 contains the same data for all the runs 702. This means that the radar occupancy probability 408 for one particle 706 contains data from all of the runs 702. Furthermore, the radar occupancy probabilities 408 are updated (e.g., at 718) using more than one particle 706. The statistical map fusion also allows for newer runs to be weighted more than older runs such that change detection (seasonal vegetation change, constructions, etc.) may be compensated on a cell level of the radar occupancy grid 308.

Figure 9:
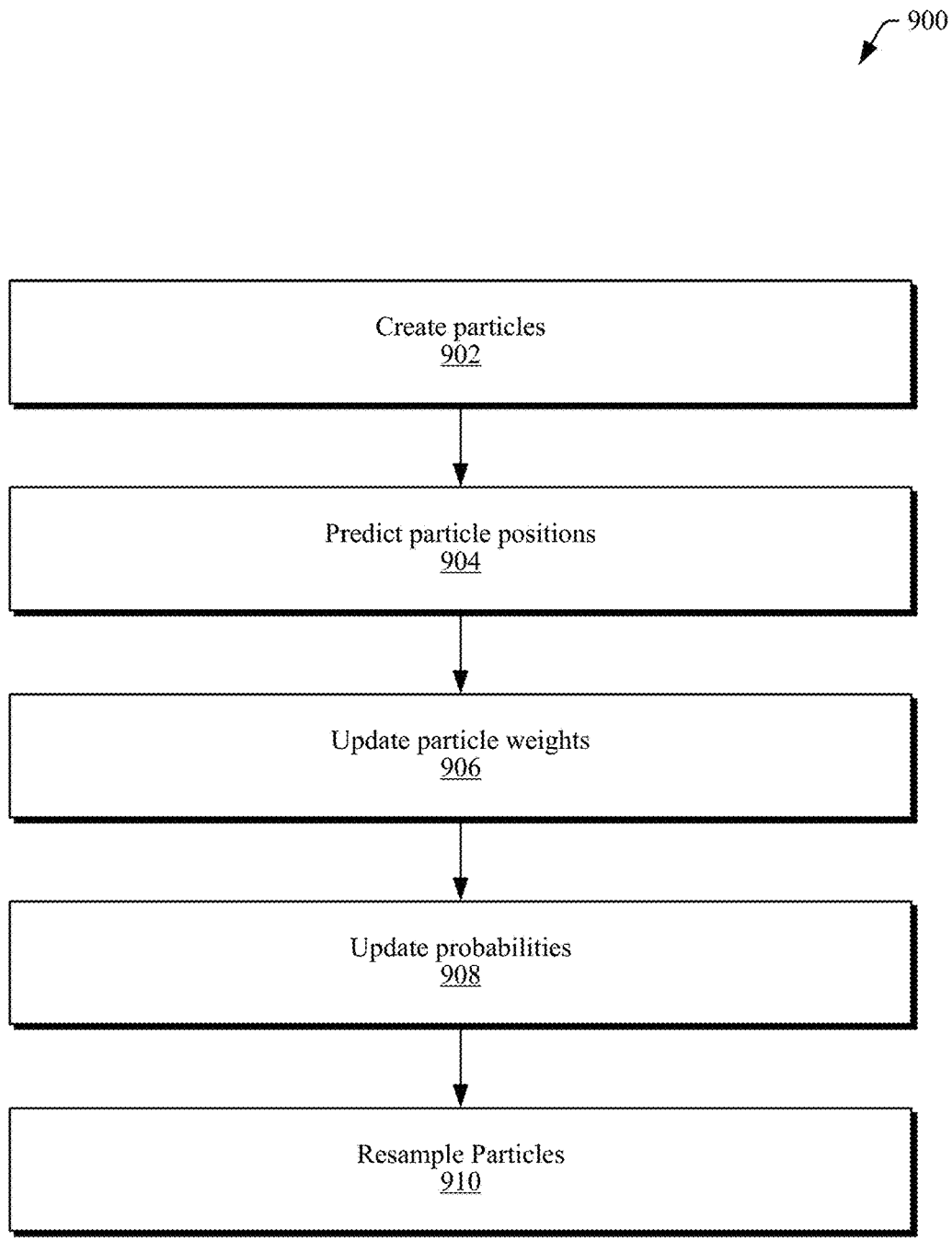
FIG. 9 is an example illustration of a process of generating a radar occupancy grid based on multiple vehicle-runs with low-accuracy location data, in accordance with techniques of this disclosure.

FIG. 9 is an example illustration 900 of a method of determining the radar occupancy probabilities 408. The example illustration 900 may be implemented utilizing the previously described examples, such as the example illustrations 700 and 800. Operations 902 through 910 may be performed by one or more entities of the system 102 and/or the cloud system 202 (e.g., the radar-localization module 210). The order in which the operations are shown and/or described is not intended to be construed as a limitation, and any number or combination of the operations can be combined in any order to implement the illustrated method or an alternate method.

At 902, particles are created. For example, the radar-localization module 210 may receive radar detections 304 and create particles 706 that correspond to possible future locations of the vehicle 104 (or vehicles if the runs 702 correspond to multiple vehicles).

At 904, particle positions are predicted for the particles. For example, the radar-localization module 210 may receive the vehicle trajectories 708 and determine the predicted positions 712.

At 906, particle weights of the particles are updated. For example, the radar-localization module 210 may determine the particle weights 716 based on radar detections 304 that correspond to a later time.

At 908, probabilities are updated based on the particle weights. For example, the radar-localization module 210 may use the particle weights 716 to determine the radar occupancy probabilities 408 for fusing at 410.

At 910, the particles are resampled. For example, the radar-localization module 210 may create resampled particles 722 for predicting future positions at 710.

Figure 10:
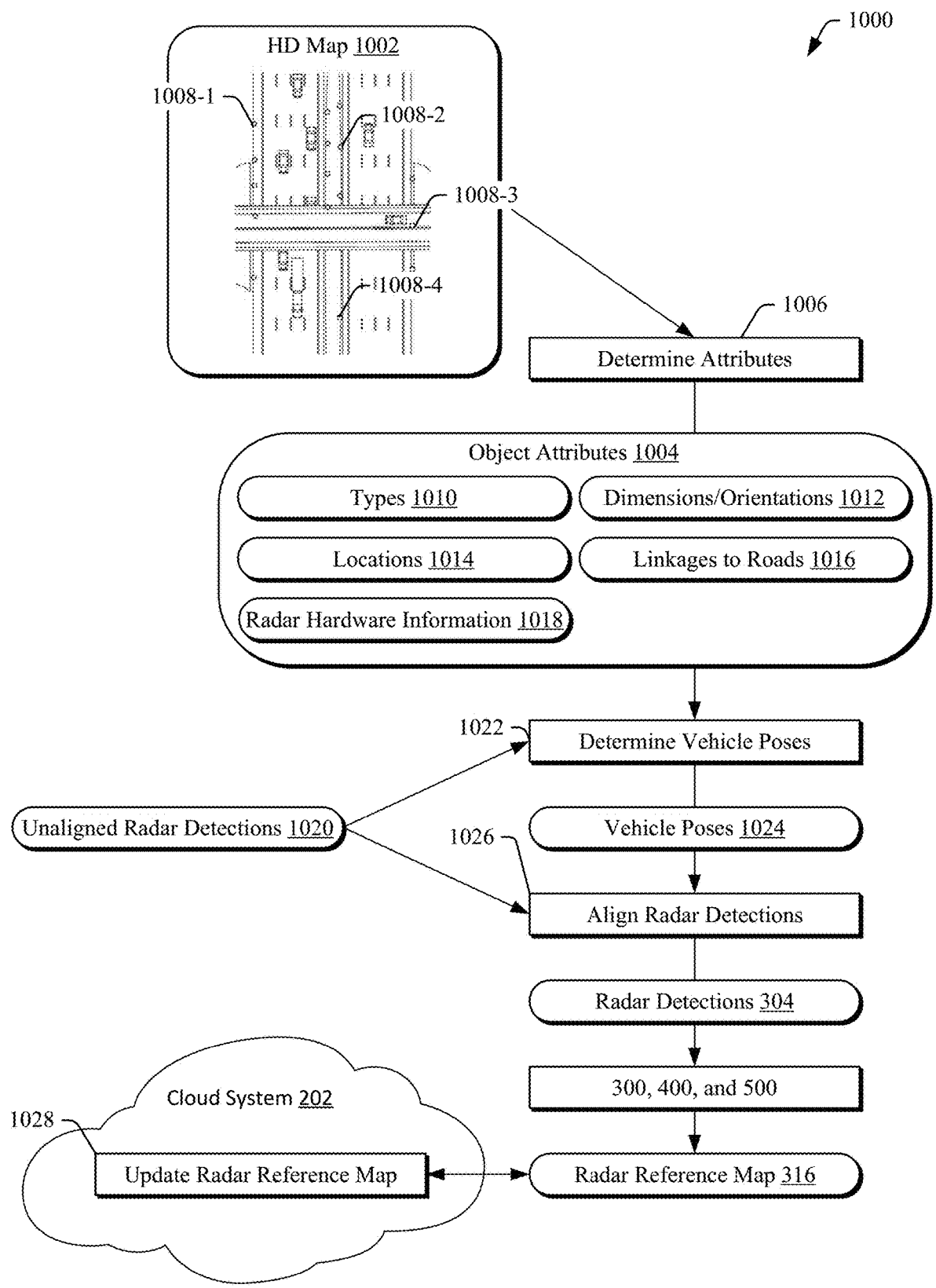
FIG. 10 is an example illustration of generating a radar reference map using low-accuracy location data and a high-definition (HD) map, in accordance with techniques of this disclosure.

FIG. 10 is an example illustration 1000 of generating the radar reference map 316 using low-accuracy location data and an HD map 1002. The example illustration 1000 is generally implemented by the system 102.

The HD map 1002 contains object attributes 1004 that are determined at 1006 for HD map objects 1008 within the HD map 1002. The HD map objects 1008 may comprise street signs, overpasses, guard rails, traffic control devices, posts, buildings, k-rails, or other semi-permanent objects. The HD map 1002 contains information about each of the HD map objects 1008.

Object attributes 1004 that may be determined at 1006 include aspects such as types 1010, dimensions/orientations 1012, locations 1014, linkages to roads 1016 for the respective HD map objects 1008, and radar hardware information 1018. The types 1010 may define the respective HD map objects 1008, such as being street signs, overpasses, guardrails, traffic control devices, posts, buildings, k-rails, or other semi-permanent objects. The dimensions/orientations 1012 may comprise physical dimensions and/or orientations (e.g., portrait vs. landscape, rotation relative to the ground, height relative to the ground) of the respective HD map objects 1008. The locations 1014 may comprise UTM coordinates of the respective objects, and the linkages to roads 1016 may comprise specific locations of the respective objects relative to the corresponding roads. For example, a guardrail may have a certain offset relative to its cited location. In other words, the guard rail itself may not exist exactly at its location 1014. The linkage to road 1016 may account for that. The radar hardware information 1018 may comprise any information that affects a radar reflection 108 from the respective HD map object 1008.

Unaligned radar detections 1020 are received, at 1022, along with the object attributes 1004. The unaligned radar detections 1020 are similar to the radar detections 304 with low-accuracy location data. The object attributes 1004 are used to determine vehicle poses 1024 for the vehicle 104 at the respective times of the unaligned radar detections 1020.

In order to do so, the vehicle may localize itself relative to one or more of the HD map objects 1008 for each set of unaligned radar detections 1020. For example, the respective set of unaligned radar detections 1020 may contain detections of the one or more HD map objects 1008. Since the locations 1014 (and other object attributes 1004) of the one or more HD map objects 1008 are known, the radar-localization module 210 can determine the vehicle pose 1024 at the respective set of unaligned radar detections 1020.

Once the vehicle poses 1024 are known for the respective unaligned radar detections 1020, the unaligned radar detections 1020 may be aligned at 1026. The alignment may comprise shifting or rotating the unaligned radar detections 1020 based on the respective vehicle poses 1024.

The aligned radar detections become the radar detections 304. The radar detections 304 may then be used in example illustrations 300, 400, and 500 to generate the radar reference map 316.

The radar reference map 316 may optionally be sent to the cloud system 202. There, at 1028, the radar reference map 316 may be updated based on, or compiled with, other radar reference maps based on other similar runs by the vehicle or other vehicles.

Figure 11:
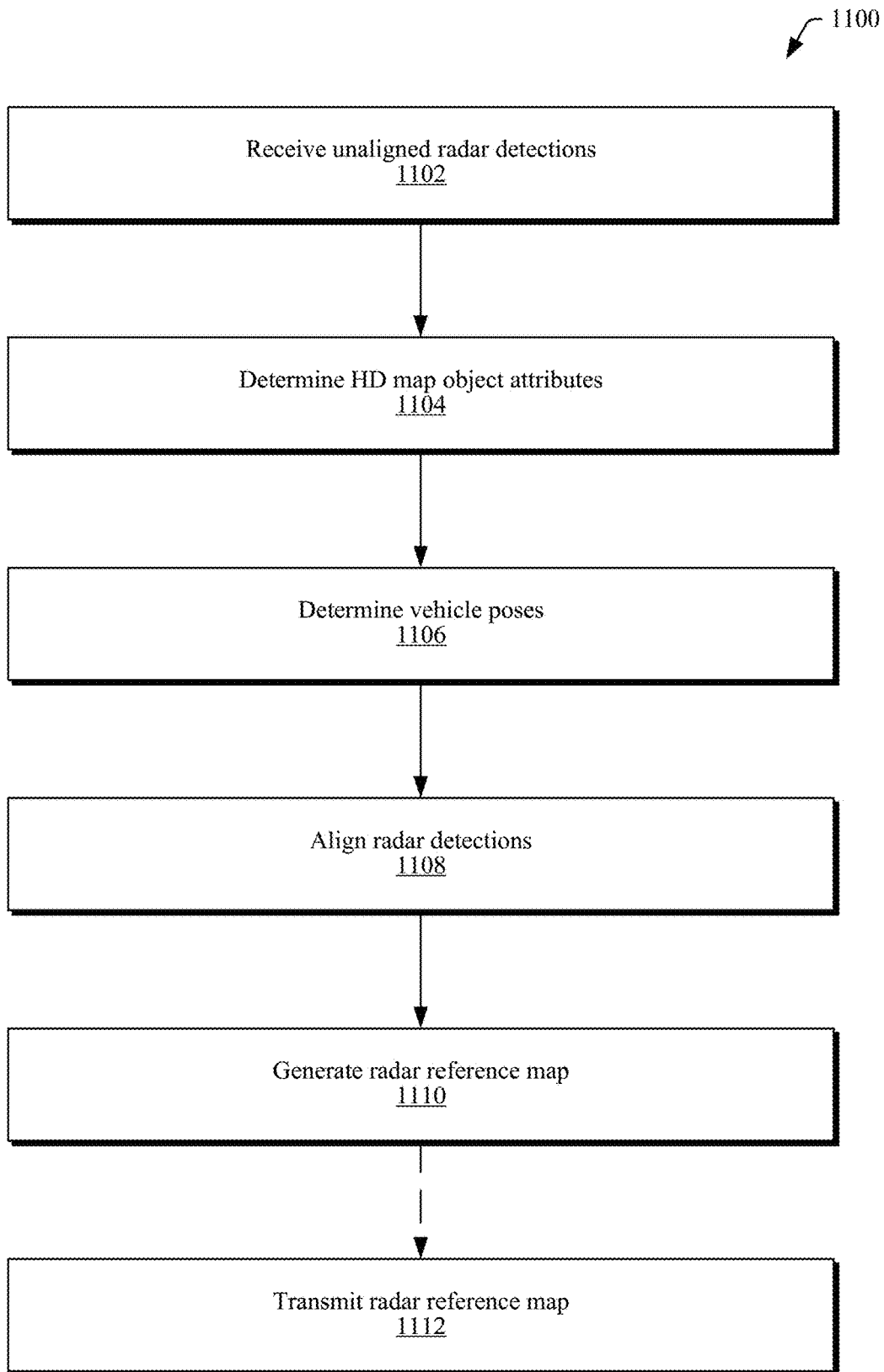
FIG. 11 is an example illustration of a process of generating a radar reference map using low-accuracy location data and an HD map, in accordance with techniques of this disclosure.

FIG. 11 is an example illustration 1100 of a method of generating the radar reference map 316 using low-accuracy location data and an HD map 1002. The example illustration 1100 may be implemented utilizing the previously described examples, such as the example illustration 1000. Operations 1102 through 1110 are generally performed by the system 102. The order in which the operations are shown and/or described is not intended to be construed as a limitation, and any number or combination of the operations can be combined in any order to implement the illustrated method or an alternate method.

At 1102, unaligned radar detections are received. For example, the radar-localization module 210 may receive the unaligned radar detections 1020.

At 1104, HD map object attributes are determined. For example, the radar-localization module 210 may determine the object attributes 1004 for the HD map objects 1008 of the HD map 1002.

At 1106, vehicle poses are determined for each set of unaligned radar detections. For example, the radar-localization module 210 may determine the vehicle poses 1024 based on the unaligned radar detections 1020 and the object attributes 1004.

At 1108, the unaligned radar detections are aligned. For example, the radar-localization module 210 may use the vehicle poses 1024 to shift the unaligned radar detections 1020. The aligned radar detections essentially become the radar detections 304.

At 1110, a radar reference map is generated. For example, the radar-localization module 210 may perform the example illustrations 300, 400, and 500 to generate the radar reference map 316 from the aligned radar detections (radar detections 304).

Optionally, at 1112, the radar reference map may be transmitted to a cloud system for updating. The updating may be based on similar reference maps generated by the vehicle or another vehicle. For example, the radar-localization module 210 of the cloud system 202 may modify or update the radar reference map 316 based on other similar radar reference maps received from the vehicle or other vehicles.

Figure 12:
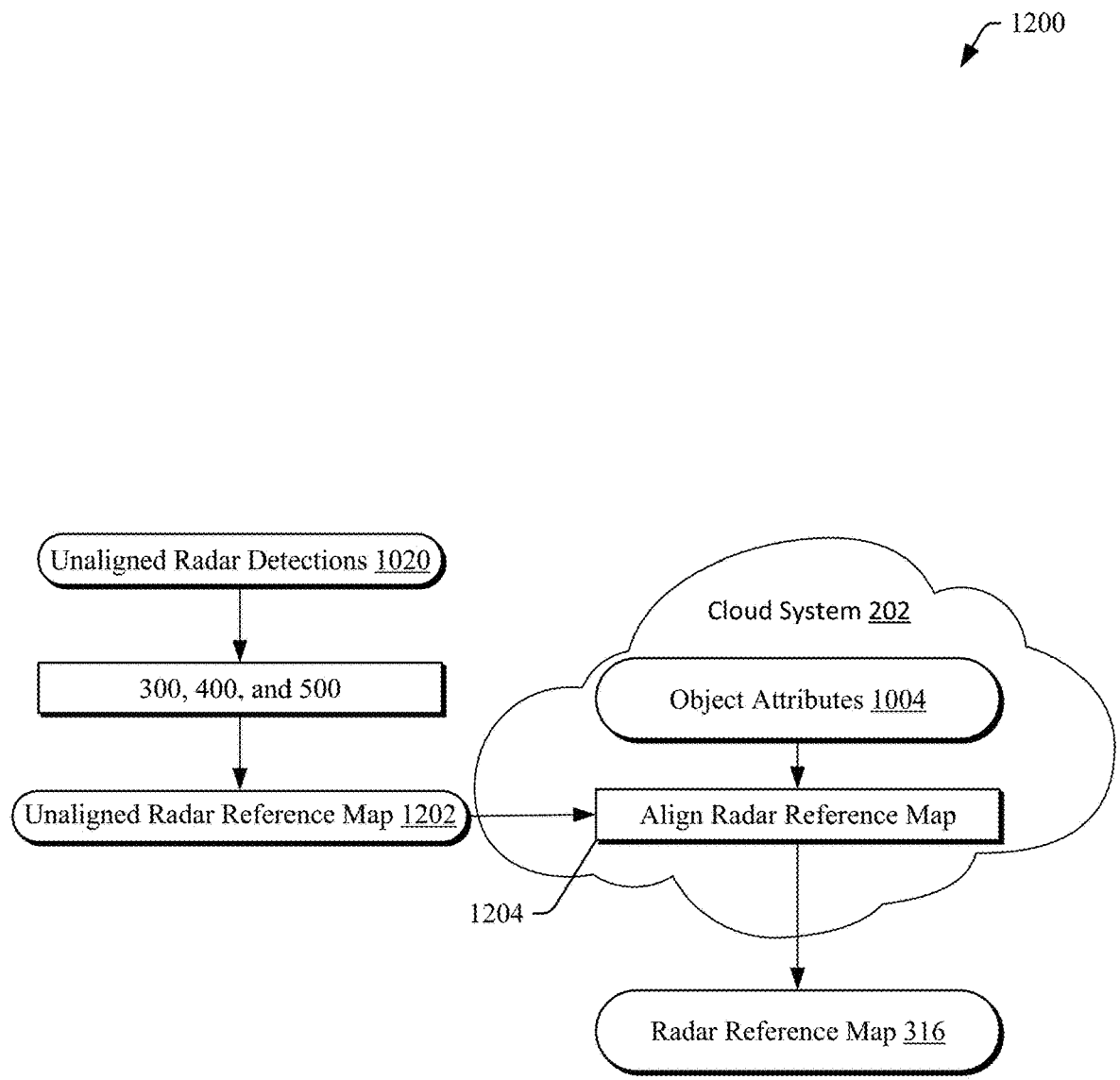
FIG. 12 is another example illustration of generating a radar reference map using low-accuracy location data and an HD map, in accordance with techniques of this disclosure.

FIG. 12 is an example illustration 1200 of generating the radar reference map 316 using low-accuracy location data and the HD map 1002 (not shown). The example illustration 1200 is generally performed by the cloud system 202 based on information received from the system 102.

At the system 102, the unaligned radar detections 1020 are run through the example illustrations 300, 400, and 500 to generate an unaligned radar reference map 1202. The unaligned radar reference map 1202 may be similar to the radar reference map 316, except that the Gaussians 318 may not be in correct places (due to low-accuracy location data).

In some implementations, only a portion of example illustration 400 may be performed. For example, the steps up to step 410 may be performed to form individual occupancy grids for respective sets of unaligned radar detections 1020, as the low-accuracy location data may not lend itself to fusing with other data to form a single radar occupancy grid (e.g., radar occupancy grid 308). Each unaligned radar occupancy grid may then be used to form the unaligned radar reference map 1202.

The unaligned radar reference map 1202 (e.g., with unaligned Gaussians that are similar to Gaussians 318) is then sent to the cloud system 202. At 1204, the object attributes 1004 of the HD map 1002 are used by the cloud system 202 to align the unaligned radar reference map 1202 to generate the radar reference map 316.

In order to do so, similarly to example illustration 1000, the object attributes 1004 are usable to align or change the Gaussians 318 within the unaligned radar reference map 1202. For example, the object attributes 1004 may be used to determine Gaussians 318 within the unaligned radar reference map 1202 that correspond to the corresponding HD map objects 1008. Since the locations of those objects are known, the Gaussians 318 can be shifted to correct locations.

If the unaligned radar detections 1020 are contiguous in space (e.g., they incrementally follow a path), then the unaligned radar reference map 1202 may have accurate locations of the Gaussians 318 relative to one another. In such a case, the unaligned radar reference map 1202 may only need to be shifted or rotated globally (instead of having to align each Gaussian 318).

The unaligned radar detections 1020 may also be sent to the cloud system 202 to process in a manner similar to example illustration 1000. The unaligned radar reference map 1202, however, is much smaller and therefore easier to transmit.

Figure 13:
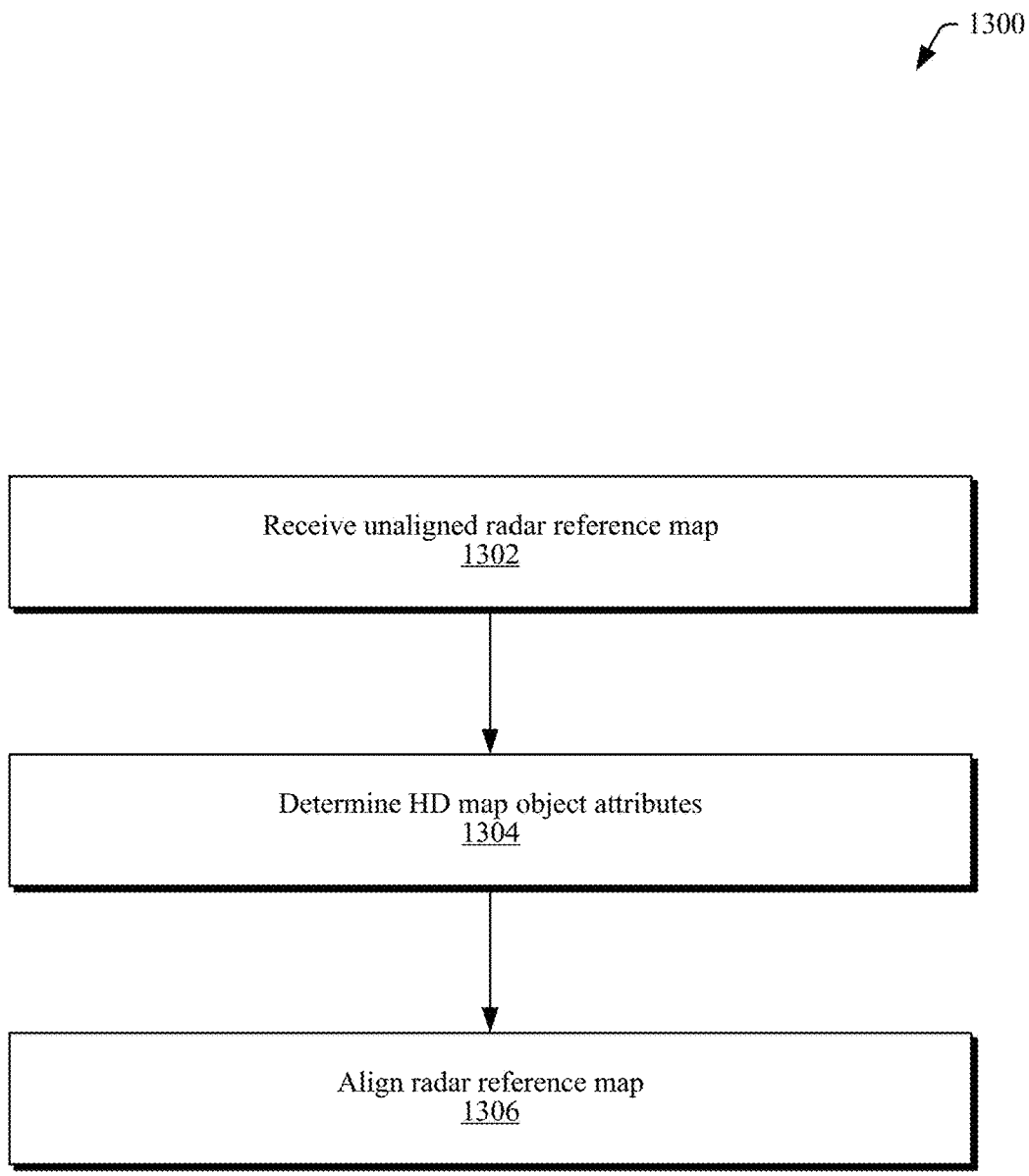
FIG. 13 is another example illustration of a process of generating a radar reference map using low-accuracy location data and an HD map, in accordance with techniques of this disclosure.

FIG. 13 is an example illustration 1300 of a method of generating the radar reference map 316 using low-accuracy location data and an HD map 1002. The example illustration 1300 may be implemented utilizing the previously described examples, such as the example illustration 1200. Operations 1302 through 1306 are generally performed by the cloud system 202. The order in which the operations are shown and/or described is not intended to be construed as a limitation, and any number or combination of the operations can be combined in any order to implement the illustrated method or an alternate method.

At 1302, an unaligned radar reference map is received. For example, the radar-localization module 210 may receive the unaligned radar reference map 1202 from the system 102.

At 1304, HD map object attributes are determined. For example, the radar-localization module 210 may determine the object attributes 1004 for the HD map objects 1008 of the HD map 1002.

At 1306, the unaligned radar reference map is aligned based on the HD map object attributes. For example, the radar-localization module 210 may use the object attributes 1004 to determine Gaussians within the unaligned radar reference map 1202 that correspond to the associated HD map objects 1008. Differences between locations of the corresponding Gaussians and the HD map objects 1008 may then be used to correct, adjust, shift, or otherwise correct the unaligned radar reference map 1202 to form the radar reference map 316.

Figure 14:
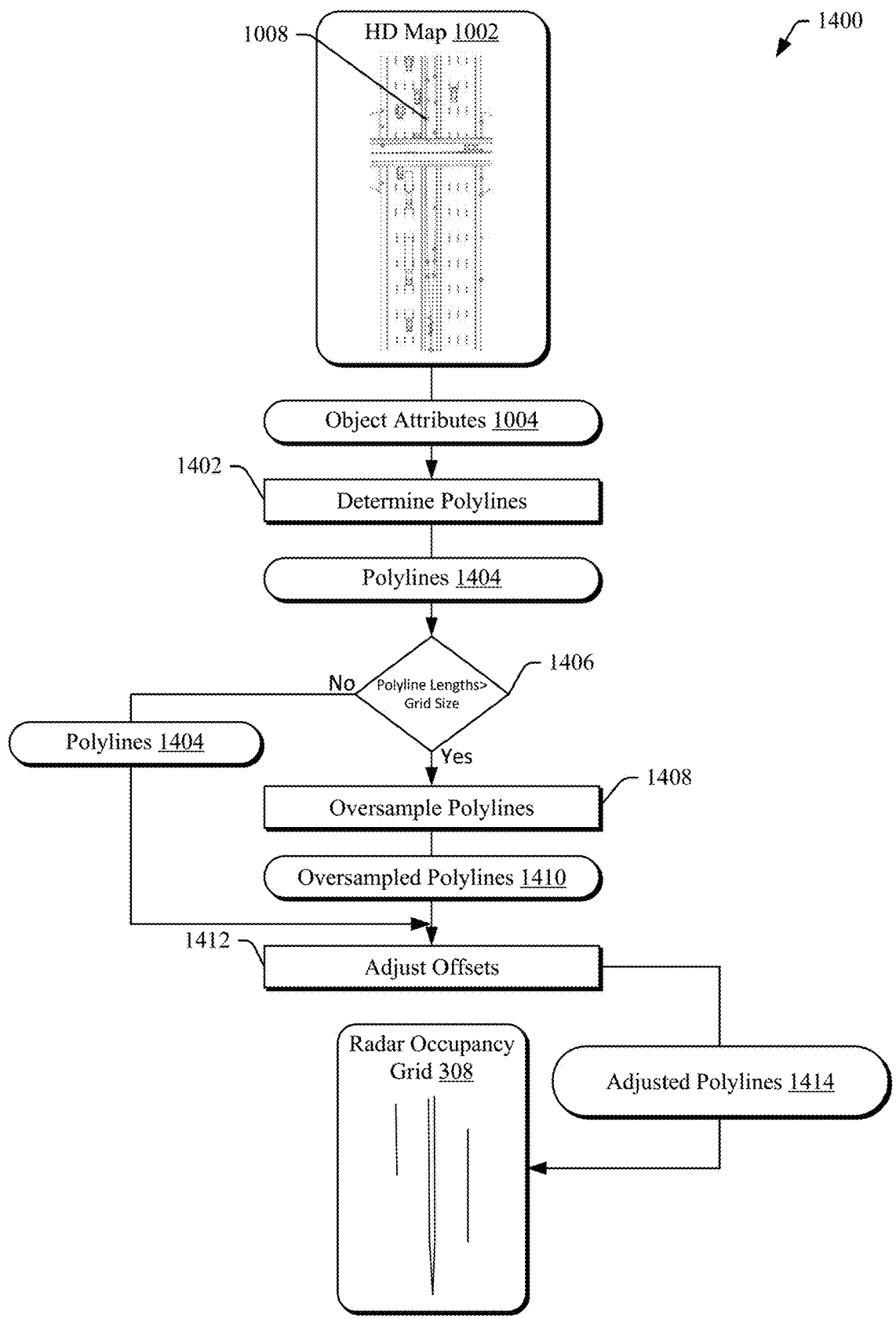
FIG. 14 is an example illustration of determining a radar occupancy grid using an HD map, in accordance with techniques of this disclosure.

FIG. 14 is an example illustration 1400 of generating the radar occupancy grid 308 using the HD map 1002. The example illustration 1400 may be integrated with example illustrations 300 and 500 to generate the radar reference map 316. The example illustration 1400 does not need radar (e.g., radar reflections 108, radar detections 304) to create the radar occupancy grid 308. As will be apparent, however, example illustration 1400 does rely on an availability of the HD map objects 1008 in the HD map 1002.

Similar to example illustrations 1000 and 1200, the object attributes 1004 of the HD map objects 1008 are determined. The object attributes 1004 are used to determine, at 1402, polylines 1404. The polylines 1404 are geometric representations of the HD map objects 1008 relative to the radar occupancy grid 308. For example, a location, orientation, and specifics (e.g., offset) of a guardrail may be used to generate a polyline 1404 of occupied spaces in the radar occupancy grid 308 that correspond to the guardrail.

At 1406, lengths of the respective polylines 1404 are compared to a grid size of the radar occupancy grid 308. If a polyline 1406 is not longer than a grid cell of the radar occupancy grid 308, the corresponding grid cell is marked as being occupied.

If, however, a polyline 1406 is longer than a grid cell, the polyline 1406 is oversampled, at 1408, to create an oversampled polyline 1410. The oversampling comprises adding more points along the respective polyline 1404 to simulate a radar occupancy grid output from radar detections (e.g., from radar detections 304).

The polylines 1404 or the oversampled polylines 1410 are then adjusted based on known sensor perception offsets, at 1412, to form adjusted polylines 1414. Continuing with the guardrail example above, the system may know that guardrails of a certain type are always some distance further away from an edge of the road than the location contained within the object attributes 1004. The adjusted polylines 1414 are used to mark corresponding grid cells of the radar occupancy grid 308 as occupied.

As shown in the example radar occupancy grid 308, the HD map objects 1008 (e.g., the guardrails) are represented as occupied spaces. In this way, the radar occupancy grid 308 may be generated without necessitating a vehicle driving through the corresponding area.

Figure 15:
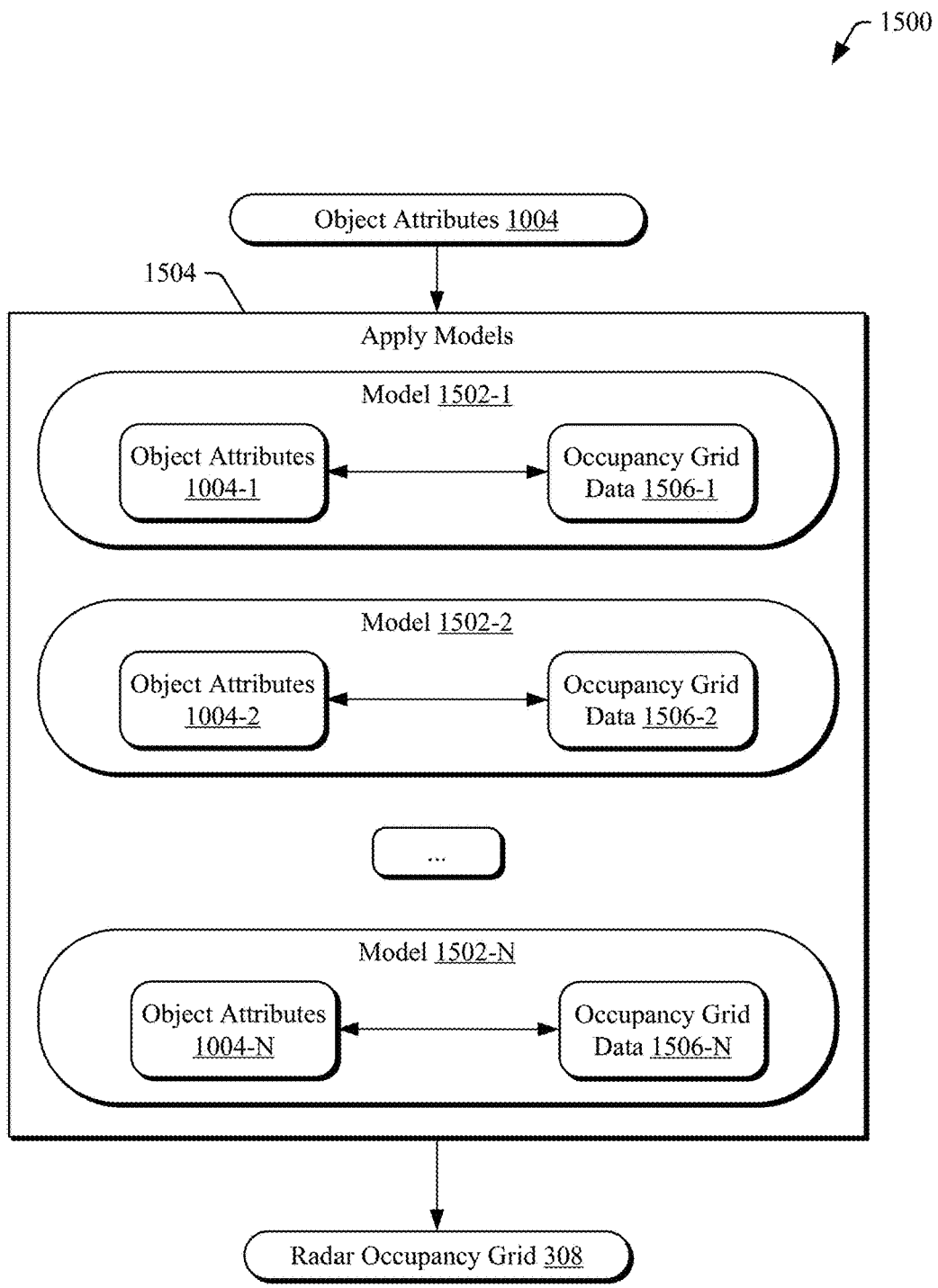
FIG. 15 is another example illustration of determining a radar occupancy grid using an HD map, in accordance with techniques of this disclosure.

FIG. 15 is an example illustration 1500 of generating the radar occupancy grid 308 using the HD map 1002 and machine-learned models. The example illustration 1500 may be integrated with example illustration 1400 (e.g., to determine offsets for the adjusting at 1412). In some implementations, however, the machine-learned models may be used to indicate cells of the radar occupancy grid 308 directly (e.g., without example illustration 1400).

In example illustration 1500, the object attributes 1004 are used to select and apply models 1502 that are used to adjust the polylines at 1412. The models 1502 are based on respective object attributes 1004.

At 1504, a model 1502 is selected and applied to each HD map object 1008. The models 1502 are categorized by respective object attributes 1004. For example, a model 1502 may exist for each type of HD map object 1008 (e.g., model 1502-1 for a guardrail, model 1502-2 for a sign, model 1502-3 for a building, etc.). Multiple models 1502 may also exist for a single type of HD map object 1008. For example, different types of guardrails may have different respective models 1502.

The models 1502 are previously generated and may be taught using machine learning on real-world occupancy grid data. For example, occupancy data (e.g., portions of that determined by example illustrations 300 and 400) may be fed into a model training program along with object attributes 1004 and HD map locations of the corresponding HD map objects 1008. In so doing, the system is able to "learn" how to represent corresponding HD map objects 1008 in the radar occupancy grid 308 (e.g., through polyline offsets).

The output of the respective models 1502 is occupancy grid data 1506 that corresponds to polyline offset data. The polyline offset data may then be used to adjust the polylines of example illustration 1400.

In some implementations, the occupancy grid data 1506 may comprise direct occupancy grid data. In such cases, polylines are not used, and the occupancy grid data 1506 is used as direct inputs to the radar occupancy grid 308 (e.g., the occupancy grid data 1506 is usable to indicate cells of the radar occupancy grid 308 as occupied).

As discussed above, the radar occupancy grid 308 can then be used to generate the radar reference map 316. In this way, real-world radar occupancy data can be used to estimate offsets or occupancy of HD map objects 608 for representation in the radar occupancy grid 308.

Figure 16:
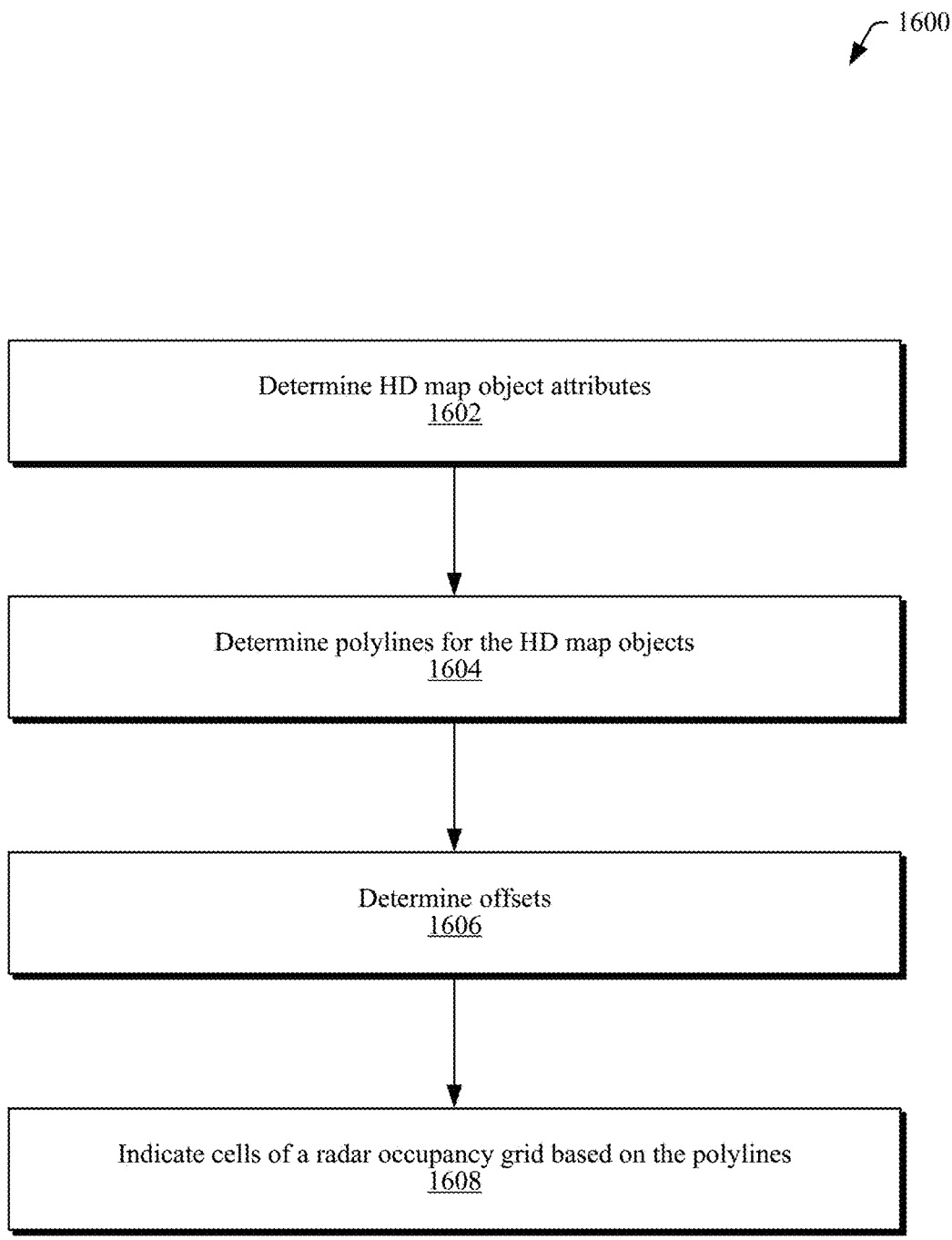
FIG. 16 is an example illustration of a process of determining a radar occupancy grid using an HD map, in accordance with techniques of this disclosure.

FIG. 16 is an example illustration 1600 of a method of generating the radar occupancy grid 308 using the HD map 1002. The example illustration 1600 may be implemented utilizing the previously described examples, such as the example illustrations 1400 and 1500. Operations 1602 through 1608 are generally performed by the cloud system 202 as there is no need for the vehicle 104. The operations 1602 through 1608 (or portions thereof) may be performed by the system 102, however. The order in which the operations are shown and/or described is not intended to be construed as a limitation, and any number or combination of the operations can be combined in any order to implement the illustrated method or an alternate method.

At 1602, HD map object attributes are determined for HD map objects within an HD map. For example, the radar-localization module 210 may determine the object attributes 1004 for the HD map objects 1008 of the HD map 1002.

At 1604, polylines for the HD map objects are determined. In some implementations, the polylines may be oversampled based on sizes of the respective polylines and a grid size of a desired radar occupancy grid. For example, the radar-localization module 210 may determine the polylines 1404 for the HD map objects 1008 and oversample the polylines 1404 if they are longer than a grid size of the radar occupancy grid 308.

At 1606, offsets are applied to the polylines as needed. The offsets may be based on the HD map object attributes or machine-learned models for the respective HD map objects. For example, the radar-localization module 210 may adjust the offsets of the polylines 1404 based on the object attributes 1004 or the models 1502.

At 1608, cells of a radar occupancy grid are indicated as occupied based on the polylines. For example, the radar-localization module 210 may indicate cells of the radar occupancy grid 308 based on the polylines 1404 (after oversampling and offsetting per 1406 and 1412).

Updating a Radar Reference Map

The following section describes techniques for updating a radar reference map. Constant improvement of the radar reference map is required because any particular environment through which a vehicle travels tends to change over time. The radar reference map may include temporary obstacles that may not be considered landmarks, which may be added or removed. Additionally, a radar reference map may include false landmark data or missing landmarks (e.g., occlusions in the radar reference map). Current techniques for updating the radar reference map often use different sensors gathering landmark data in a single traversal of an environment. The techniques described below use radar-centric data gathered from multiple iterations of traversing the environment to update the quality of the radar reference map. The techniques use a process to ensure accurate and stable data, referred to as hindsight; two non-limiting examples of which are illustrated. One example uses radar detections of objects and compares them with an HD map. The second example uses only radar detections in using hindsight as a way to ensure the data is accurate and stable.

Figure 17:
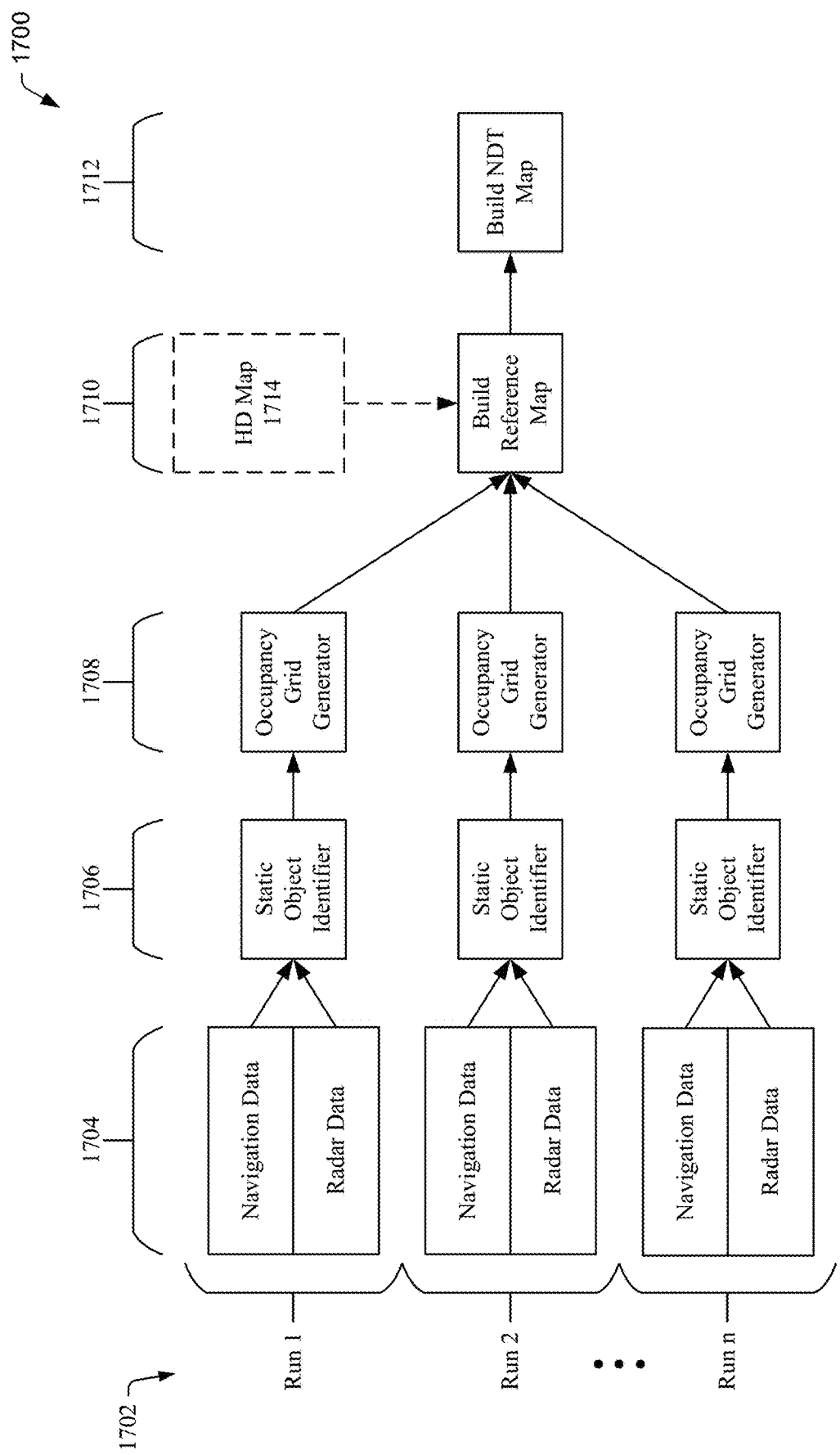
FIG. 17 illustrates a flow chart as an example process for updating, through multiple iterations, a radar reference map used for vehicle localization based on radar detections, in accordance with techniques of this disclosure.

FIG. 17 illustrates a flow chart 1700 for updating, through multiple iterations, a radar reference map used for vehicle localization based on radar detections. The flow chart includes multiple runs 1702 (e.g., run 1 to run n where n can be any integer greater than 1), with each run being an iteration through an environment represented by a radar reference map. A first step 1704 of a radar-localization module (e.g., radar-localization module 210 from FIG. 2-1) is to receive radar detections and navigation data. In a step 1706, the radar detections and navigation data may be used by a static object identifier to identify static objects from the raw radar detections and navigation data collected in step 1704. A step 1708 generates an occupancy grid based on the static objects identified in step 1706. In a step 1710, a radar reference map is built from each occupancy grid generated in each run 1702. A final step 1712 builds (in the initial run 1) and updates (in each successive run n) a relative NDT radar reference map (e.g., a map relative to the vehicle and using a relative coordinate system) based on the radar reference map generated in step 1710. The final step 1710 is conditioned on an HD map 1714 not being utilized in step 1710 in combination with the occupancy grids generated in step 1708. Otherwise if the HD map 1714 is utilized in step 1710, the final step 1712 updates an absolute map (e.g., a universal map using a global coordinate system such as the UTM coordinate system) during each run 1702.

Figure 18:
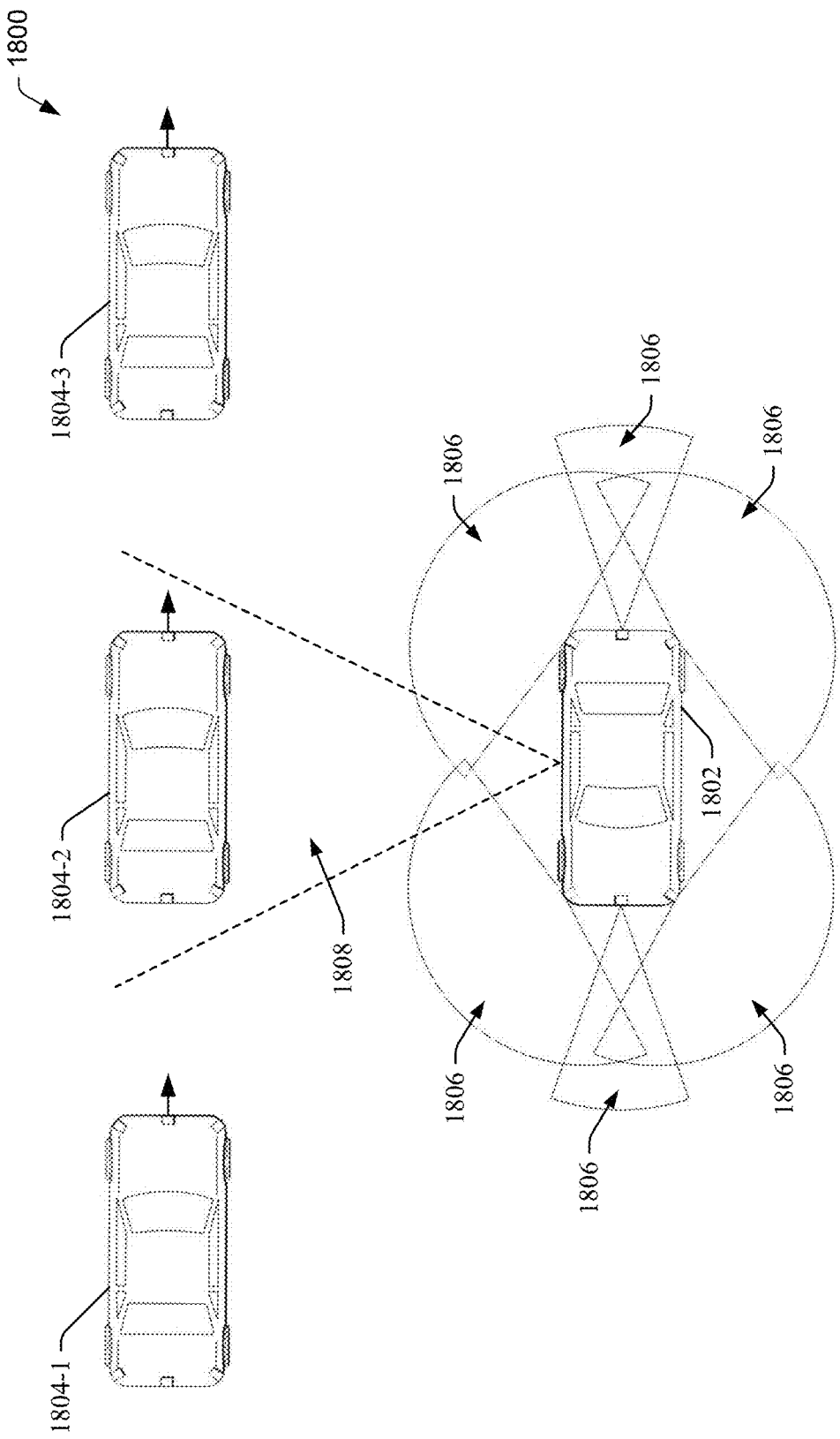
FIG. 18 illustrates an example implementation 1800 of a system configured to update, through multiple iterations, a radar reference map used for vehicle localization based on radar detections, in accordance with techniques of this disclosure.

FIG. 18 illustrates an example implementation 1800 of updating, through multiple iterations, a radar reference map used for vehicle localization based on radar detections. In the example implementation 1800, a vehicle 1802 equipped with a radar-localization module (e.g., onboard, accessed through a cloud) uses hindsight to accumulate accurate and stable radar data about a dynamic object 1804. Radar sensors on the vehicle 1802 have radar sweeps 1806 that transmit electromagnetic energy and receive the reflections of the electromagnetic energy off of objects. The radar sweeps 1806 may not be illustrated to scale in FIG. 18 or in any of the other figures in which they are depicted. The dynamic object 1804 is moving from in front (dynamic object 1804-1) of the vehicle 1802 to beside (dynamic object 1804-2) the vehicle 1802 to behind (dynamic object 1804-3) the vehicle 1802. A blind spot 1808 represents a range-rate blind spot of one or more radar sensors on the vehicle 1802. Although in the example implementation 1800, the blind spot 1808 is related to the range rate state of the dynamic object, any dynamic state of the dynamic object 1804 may be used as an example.

Corner radar sensors mounted on the vehicle 1802 are configured such that the bore angles of the radar sensors are 45° in relation to the longitudinal axis of the vehicle 1802. This enables the corner radar sensors to have the same radar performance as the front and rear radar sensors of the vehicle 1802. The accumulated data from all the radar sensors present the most stable results of object detection at the rear of the vehicle 1802 with the dynamic object 1804 reflecting several radar detections from the different radar sensors. As an occupancy grid presents accumulated data, all available sensor detections contribute to a radar reference map even if the rear detection is the only one taken into consideration. The detections from all the radar sensors contribute to the occupancy probability, and none of the radar data are omitted. This process may be interpreted as an application of binary weights for each cell of the occupancy grid, and the dynamic object 1804 may be excluded from the updated radar reference map.

Figure 19:
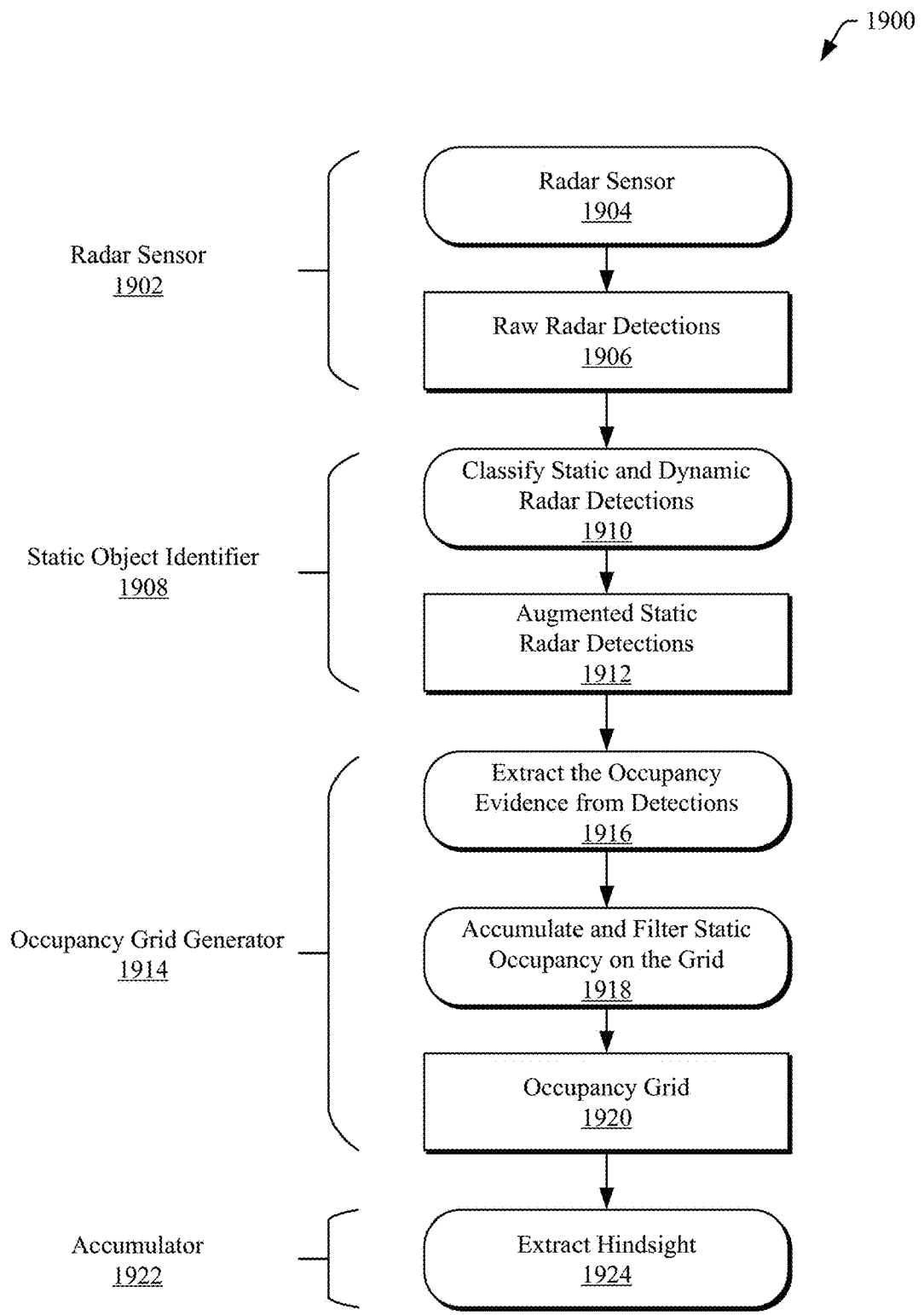
FIG. 19 illustrates a pipeline for updating, through multiple iterations, a radar reference map used for vehicle localization based on radar detections, in accordance with techniques of this disclosure.

FIG. 19 illustrates a pipeline 1900 for updating, through multiple iterations, a radar reference map used for vehicle localization based on radar detections. At a radar sensor stage 1902 of the pipeline 1900, a radar sensor 1904 receives raw radar detections 1906. At a static object identifier 1908 stage, the raw radar detections 1904 are classified at 1910 as static or dynamic radar detections, and augmented static radar detections 1912 are passed to an occupancy grid generator 1914 stage. In the occupancy grid generator 1914 stage, occupancy evidence from the augmented static radar detections 1912 is extracted at 1916. At 1918, the extracted occupancy evidence from 1916 is used to accumulate and filter static occupancy on an occupancy grid 1920. An accumulator 1922 stage then extracts hindsight information at 1924.

Figures 1, 20:
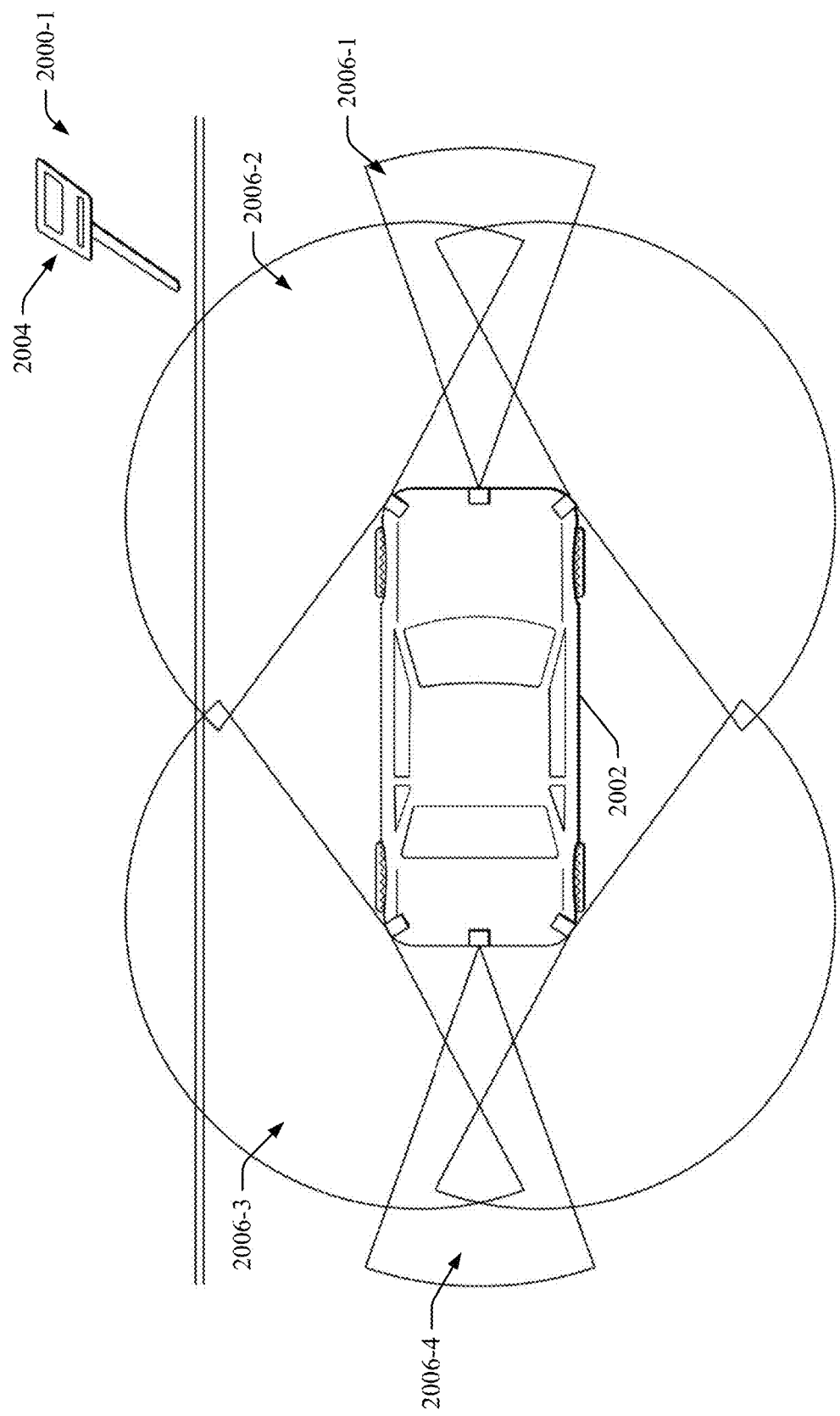
Figures 2, 20:
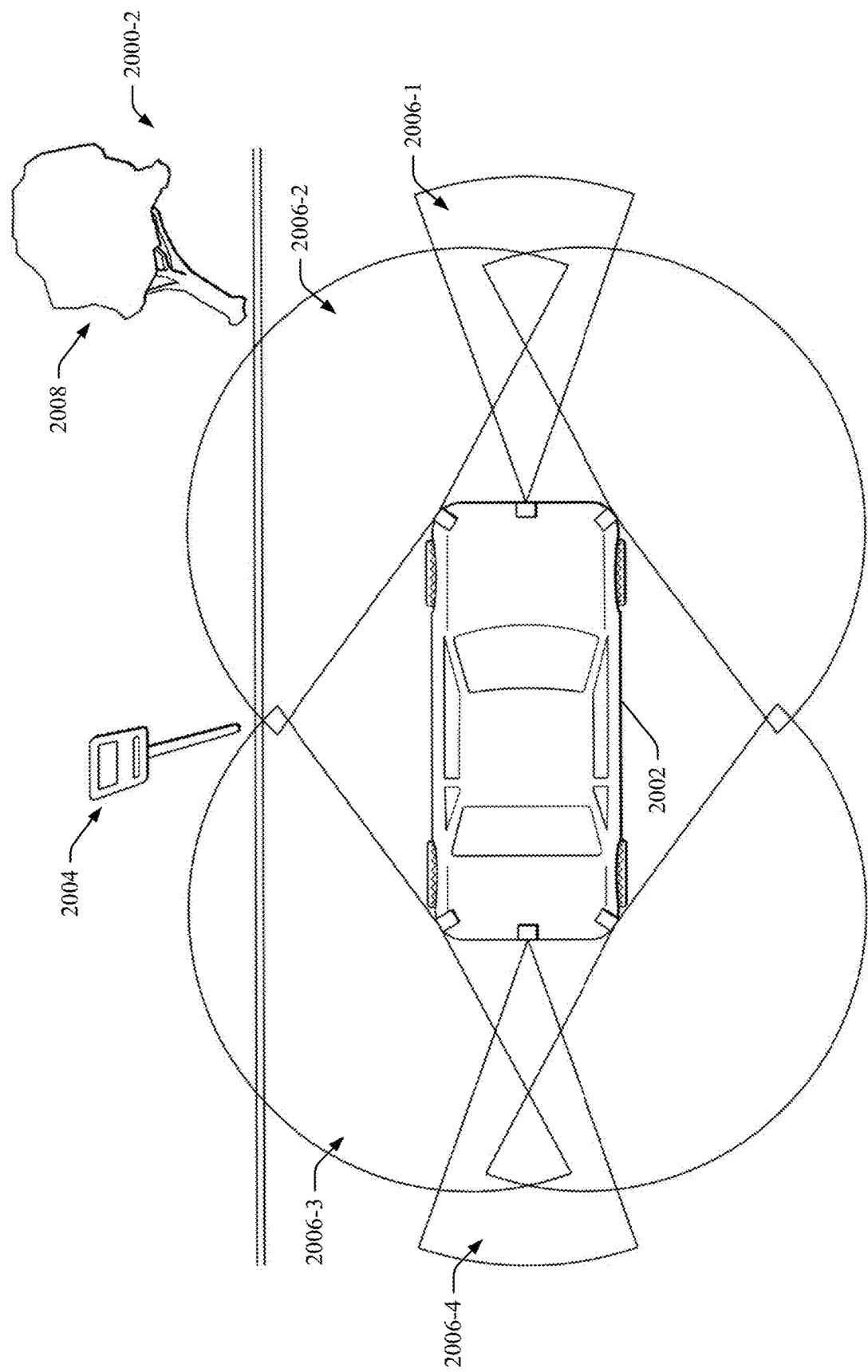
Figures 3, 20:
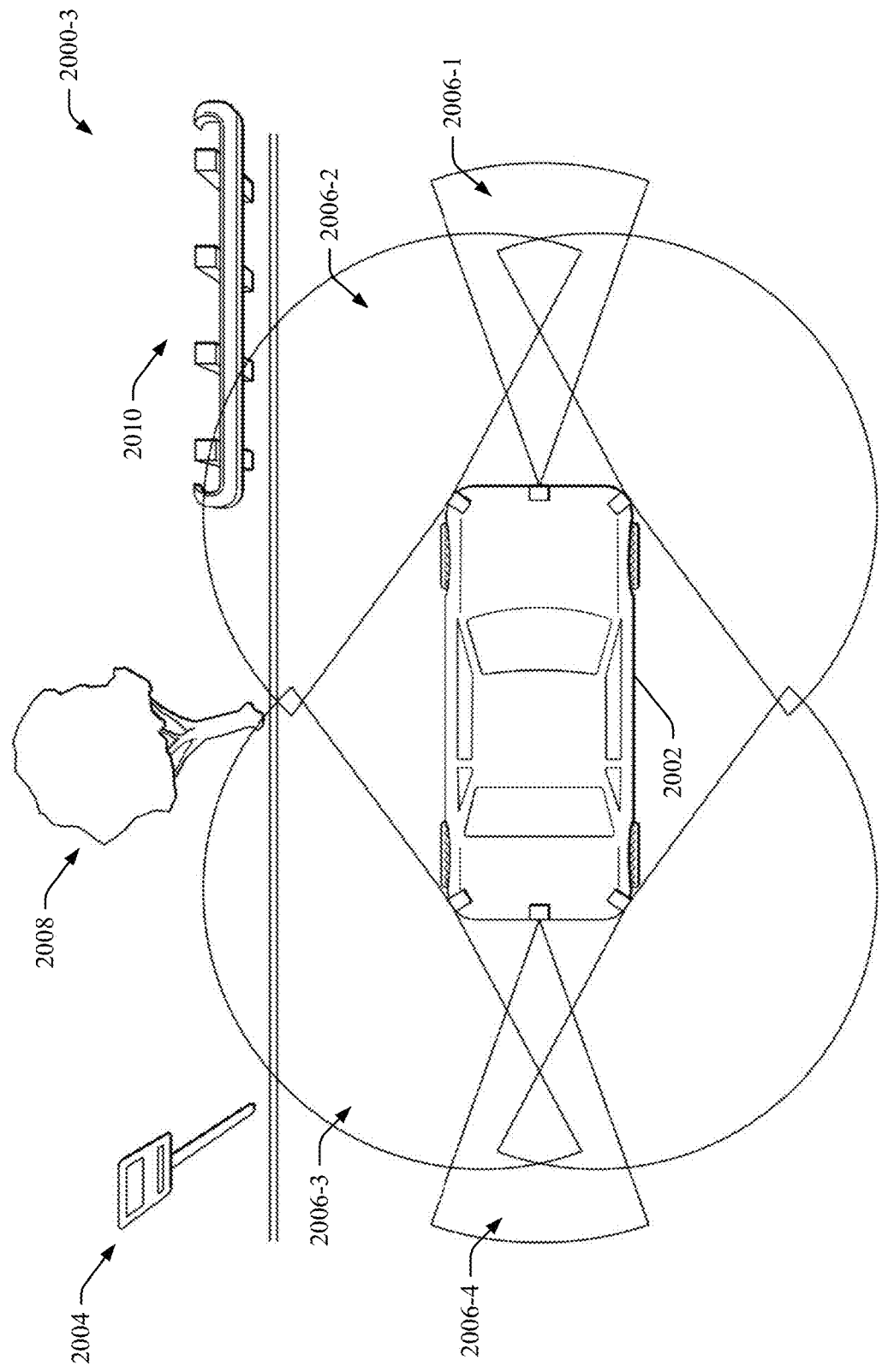

FIGS. 20-1 to 20-3 illustrate an example implementation of hindsight used to update, through multiple iterations, a radar reference map used for vehicle localization based on radar detections. In FIG. 20-1, a vehicle 2002, equipped with a radar-localization module (e.g., onboard, accessed through a cloud) uses hindsight to accumulate accurate and stable radar data about a static object 2004 (a street sign 2004). In a first time frame 2000-1 in FIG. 20, the street sign 2004 may be detected first by radar sweeps 2006-1 and 2006-2. Radar sweeps 2006-3 and 2006-4 have not yet detected the street sign 2004.

In a second time frame 2000-2 in FIG. 20-2, the vehicle 2002 has moved down the road, and the street sign 2004 is lateral to the vehicle 2002. At least radar sweeps 2006-1, 2006-2, and possibly radar sweep 2006-3 have detected the street sign 2004. Additionally, radar sweeps 2006-1 and 2006-2 may have detected a second static object 2008 (a tree 2008).

In a third time frame 2000-3 in FIG. 20-3, the vehicle 2002 has moved forward such that the street sign 2004 has been detected by radar sweeps 2006-1, 2006-2, 2006-3, and 2006-4, accumulatively. At this point, the street sign is in hindsight of the radar sweeps, and the radar data relative to the street sign may be considered stable and accurate with a high confidence level. At least radar sweeps 2006-1, 2006-2, and possibly radar sweep 2006-3 have detected the tree in time frame 2000-3 and have a moderate confidence level, but higher than a third static object 2010 (a guard rail 2010). Only sweeps 2006-1 and 2006-2 may have detected the guard rail 2010.

Driving on the road in the depictions 2000-1 to 2000-3 over multiple iterations may increase the confidence level that the static objects 2004, 2008, and 2010 are permanent and can be considered landmarks. If any of the static objects 2004, 2008, and 2010 disappear during any of the multiple iterations of runs down the road, the confidence level for that object may fall, and the object may be removed from the updated radar reference map. In this manner, the radar reference map may be updated after each iteration to add or remove landmarks as they are detected or disappear, and to remove any spurious noise that may be present in the radar reference map.

Figure 21:
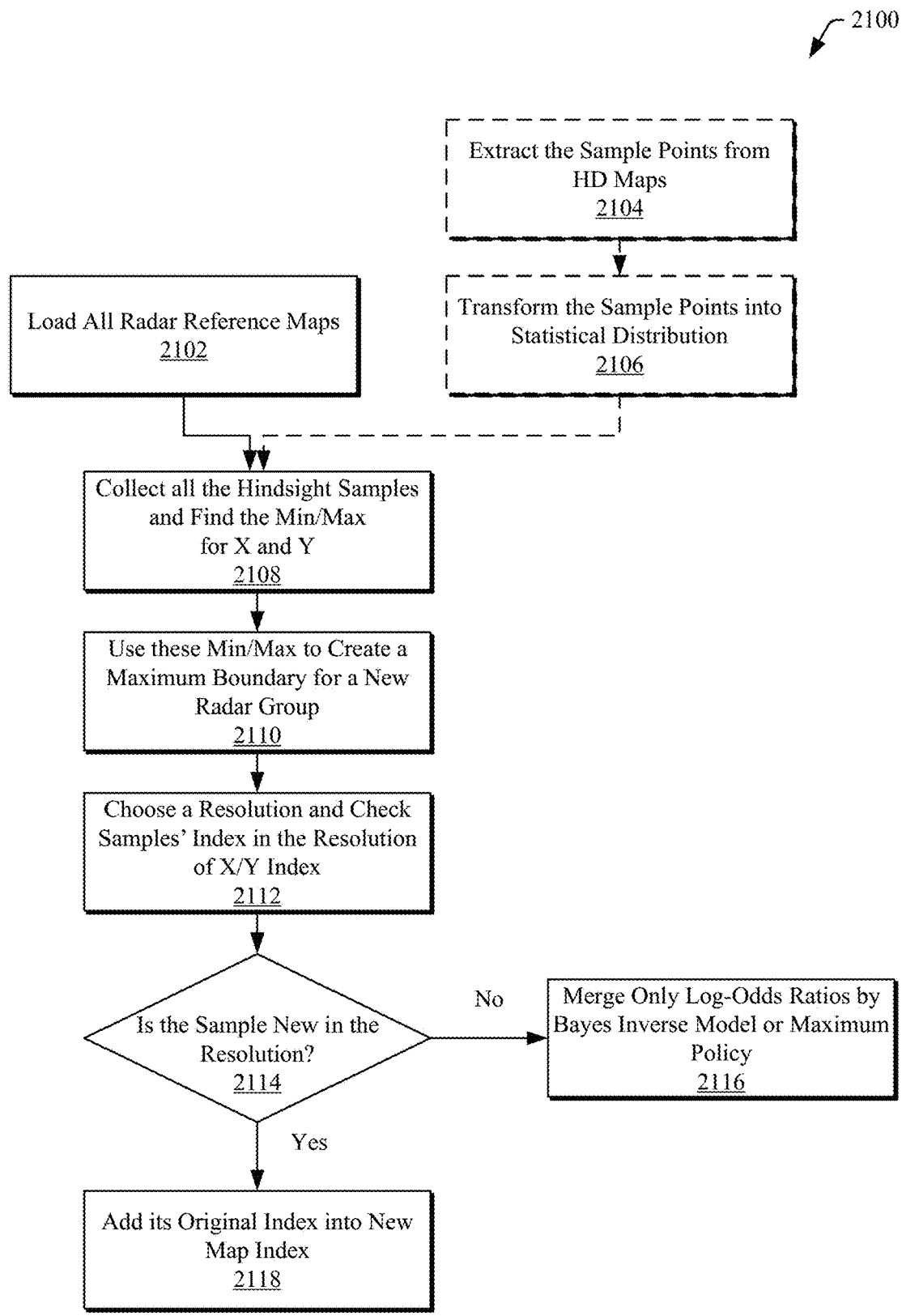
FIG. 21 illustrates an example process for determining a hindsight maximum boundary for radar coordinates when updating, through multiple iterations, a radar reference map used for vehicle localization based on radar detections, in accordance with techniques of this disclosure.

FIG. 21 illustrates an example process 2100 to determine and use a hindsight maximum boundary for radar coordinates when updating, through multiple iterations, a radar reference map used for vehicle localization based on radar detections. There are two options for radar coordinates, radar relative coordinates, and radar absolute coordinates. At 2102, all radar reference maps are loaded. Additionally, if using radar absolute coordinates, at 2104, sample points from one or more HD maps are extracted, and at 2106, the extracted sample points are transformed into a statistical distribution. At 2108, all of the hindsight samples are collected, and a minimum and maximum for the coordinates (X and Y) are found. At 2110, the minimum and maximum for the coordinates are used to create a maximum boundary for a new radar group. At 2112, a resolution is chosen, and an index of the samples in the resolution of the coordinates index is checked. At 2114, based on the outcomes of the check procedure at 2112, if the sample is not new in the chosen resolution, then at 2116, only the log-odds ratios, by either Bayes Inverse Model or by maximum policy, are merged into the radar reference maps. If, at 2114, the sample is new in the chosen resolution, then at 2118, the original index of the new sample is added into a new map index.

Example Architecture

Applying the techniques discussed in this document to localize a vehicle based on radar detections may have many advantages. By using radar-centric systems (e.g., a radar system including four short-range radar sensors, one radar sensor located at each of the four corners of a vehicle), adverse weather and lighting conditions that may degrade the effectiveness of other systems (e.g., cameras, LiDAR) are overcome by only using radar systems. Additionally, the radar systems used may be less expensive than some other sensor systems.

Figures 1, 22:
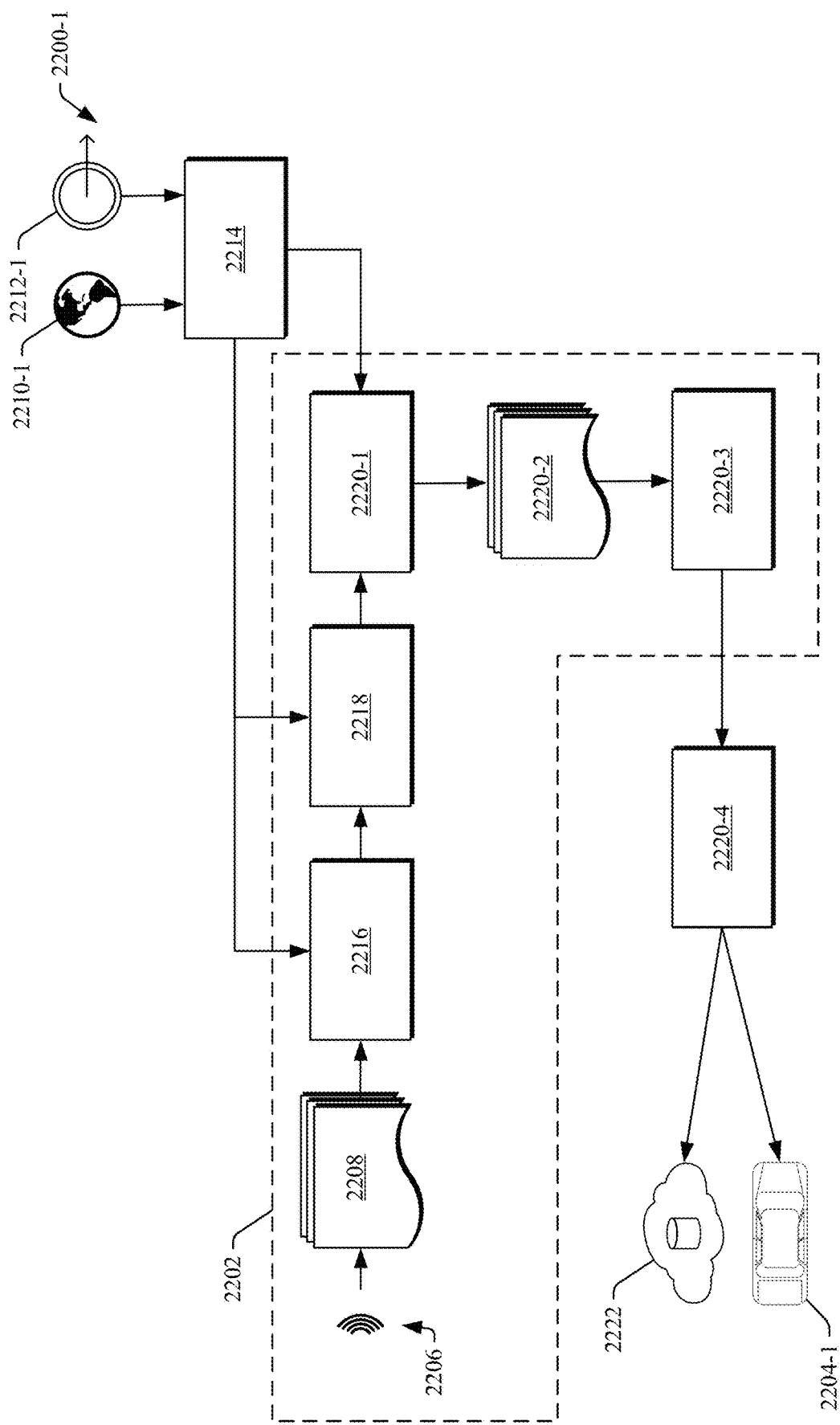
Figures 2, 22:
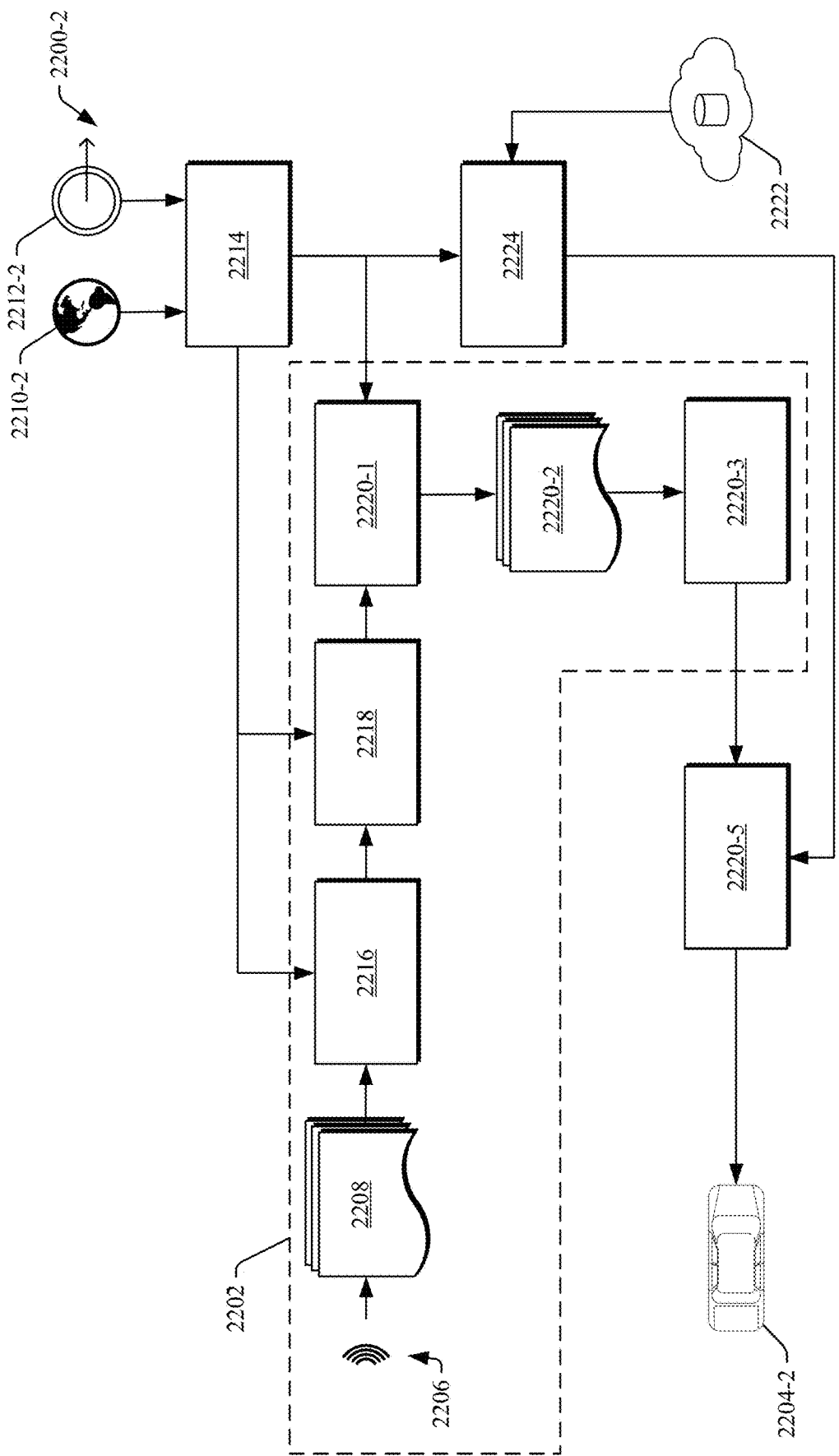

The techniques and systems described in this document enable a vehicle to determine its vehicle pose, or location, at a sub-meter accuracy level. To localize a vehicle based on radar detections, according to the techniques described herein, two steps may be performed, including steps to: construct an accurate radar reference map, and compare the radar reference map against radar detections generated in real time to accurately locate the vehicle. FIGS. 22-1 and 22-2 describe one detailed example of how to achieve these two steps with a radar-localization module, such as the radar-localization module illustrated in FIGS. 2-2 and 2-3. Other examples may preclude some of the details in FIGS. 22-1 and 22-2 (e.g., some submodules of the radar-localization module are optional, as illustrated in FIGS. 2-2 and 2-3).

FIGS. 22-1 to 22-2 illustrate an example flow diagram 2200 of a process for vehicle localization based on radar detections. FIG. 22-1 covers the first step as flow diagram 2200-1, and FIG. 22-2 covers the second step as flow diagram 2200-2. The sub-steps within a dashed box 2202 of FIG. 22-1 and FIG. 22-2 are identical in each step.

The first step of vehicle localization 2204 is to construct an accurate radar reference map containing landmark information. Details of several different processes of constructing the radar reference map have been described above. The example flow diagram illustrated in FIG. 22-1 details the architecture of constructing the radar reference map in the vehicle 2204-1 specially equipped with a high-quality navigation system. The radar-localization module is in a reference mode for this step.

In the example flow diagram illustrated in FIG. 22-1, one or more radar sensors 2206 receive raw radar detections 2208. Simultaneously, high-quality GNSS 2210-1 and inertial measurement unit (IMU) 2212-1 data are collected by a vehicle state estimator 2214 to determine the vehicle state and vehicle pose. The raw radar detections 2208 are collected at a certain rate, for example, every 50 milliseconds (ms). The raw radar detections 2208 are identified as static detections or dynamic detections by a static object identifier 2216. The static object identifier 2216 uses vehicle state information (e.g., range rate) provided by the vehicle state estimator 2214 to determine (e.g., determine through range rate de-aliasing) the identification of the raw radar detections 2208.

The static detections are output to an occupancy grid generator 2218. The occupancy grid generator 2218 estimates an occupancy probability for each cell (e.g., 20 centimeters (cm) by 20 cm cell) in the occupancy grid. The cell size may impact the processing time for this sub-step. Different processes, including Bayesian inference, Dempster Shafer theory, or other processes, can be used to estimate the occupancy probability for each cell. The occupancy grid generated by the occupancy grid generator 2218 may be in relative coordinates (e.g., local frame of reference) to the vehicle 2204-1 as the occupancy grid generator 2218 receives vehicle state data from the vehicle state estimator 2214 that assists in the creation of the occupancy grid.

A scan-matcher 2220 performs a series of sub-steps 2220-1 to 2220-4. Sub-step 2220-1 transforms the occupancy grid from a relative coordinate system to a UTM coordinate system. Vehicle state information from the vehicle state estimator 2214 is used in the transformation process. Sub-step 2220-2 accumulates occupancy grid outputs from sub-step 2220-1 at a certain rate (e.g., 10 Hz). The rate may be tuned based on a driving scenario (e.g., quantity of landmarks in the environment of the vehicle 2204-1) and outputs the accumulated occupancy grid to sub-step 2220-3. Sub-step 2220-3 chooses occupancy grid cells based on a high-occupancy probability (e.g., a probability equal to or greater than 0.7). The chosen occupancy grid cells may be represented as a point cloud. Sub-step 2220-4 transforms the chosen occupancy grid cells in a Gaussian representation to create a Gaussian, or NDT, radar reference map. The NDT radar reference map can be stored locally on the vehicle 2204-1 or uploaded to a cloud 2222.

The second step of vehicle localization 2204 is to determine an adjusted vehicle pose based on a comparison of radar detections of landmarks with a radar reference map. The example flow diagram in FIG. 22-2 details the architecture used to determine this adjusted vehicle pose for the vehicle 2204-2. It can be assumed in this example that the vehicle 2204-2 is configured as a non-luxury vehicle manufactured in mass quantities and at cost margins that make using high-quality GNSS and sensor packages not practical. That is, the GNSS system 2210-2 and the IMU 2212-2 used in the vehicle 2204-2 may be considered average (lower quality) commercial navigation systems. The radar-localization module is in a real-time localization mode for the second step. All of the sub-steps inside the dashed box 2202 are identical to those of the first step illustrated in FIG. 22-1 and, for simplicity, will not be covered again.

At step 2224, a radar reference map, based on the vehicle state as determined by the vehicle state estimator 2214, is downloaded from the cloud 2222. The radar reference map is compared to the chosen occupancy grid cells at sub-step 2220-5, and based on that comparison, the vehicle pose is corrected for the vehicle 2204-2. A confidence level of an accuracy of the corrected pose may be used in determining the accuracy of the corrected pose. Additionally, the corrected vehicle pose may be used to remove errors (e.g., drift) in the GNSS system 2210-2 and the IMU 2212-2.

The comparison process matches the radar reference map, the radar reference map being a set of Gaussian representations that minimize memory size of the data and contain statistical information, with a real-time "map" that is derived from real-time radar detections. The real-time map is a sub-section of the area represented by the radar reference map and contains the same Gaussian-type statistical information as the radar reference map. In another implementation, the filtered outputs from the occupancy grid may be directly compared to the Gaussians in the radar reference map.

The NDT process matches statistical probability distributions between reference data (e.g., discretized cells with a built-in statistical model). For any given transformation (e.g., x, y, and rotation) for real-time points (e.g., occupancy grid outputs), the real-time points can be assigned to discretized NDT cells that contain the statistical distribution in a model from the radar reference map. The real-time points are occupancy grid cells that are considered occupied but are treated as points with a probability value attached to the points. Probability distributions of the real-time points can therefore be calculated. The NDT process finds an optimal transformation that maximizes the probability distributions.

Figure 23:
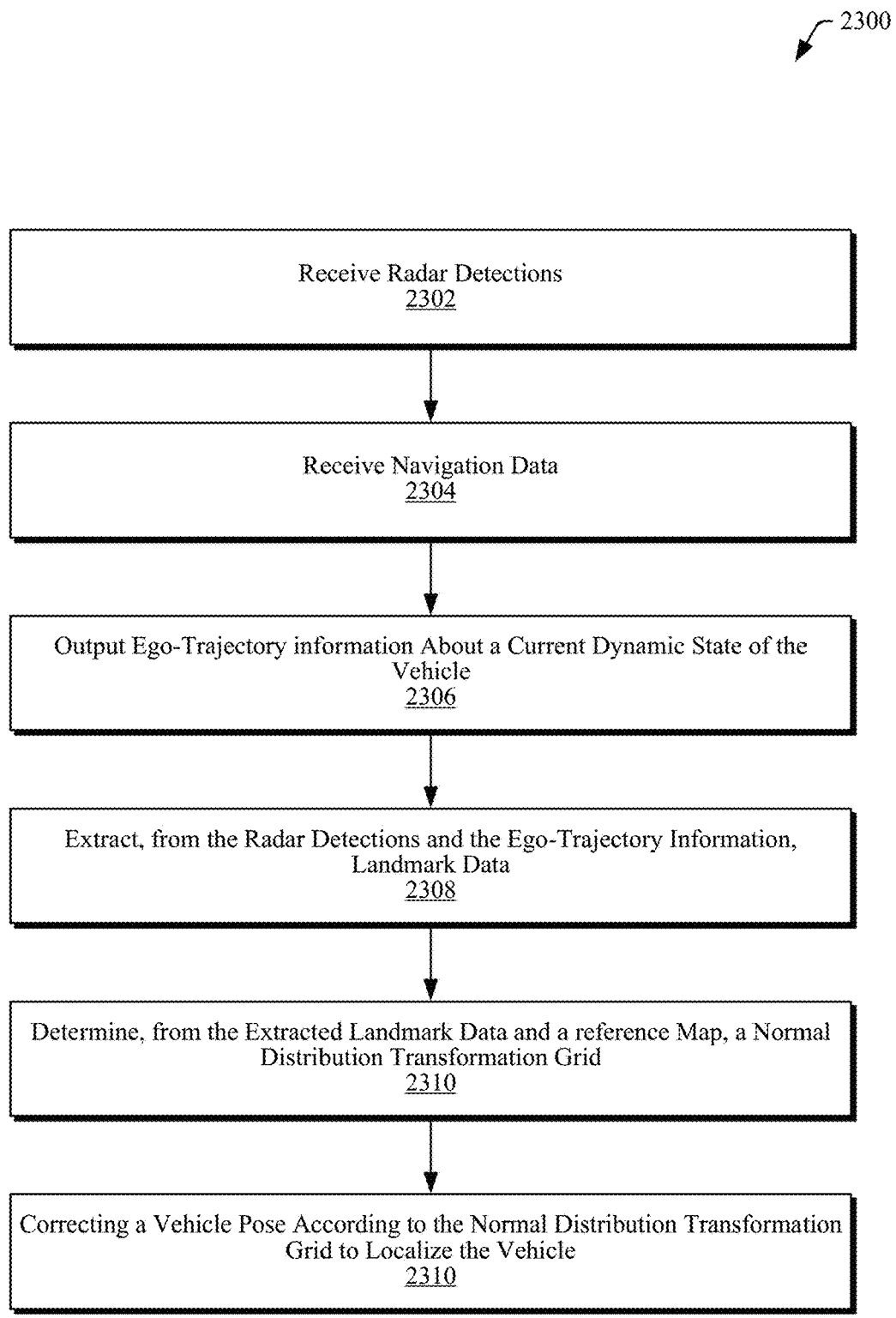
FIG. 23 illustrates a flow chart of an example process for vehicle localization based on radar detections.

FIG. 23 illustrates an example process 2300 for vehicle localization based on radar detections. At 2302, radar detections are received by at least one or more processors of a vehicle. At 2304, navigation data is received by at least one or more processors of a vehicle. At 2306, Ego-trajectory information about a current dynamic state of the vehicle is output by at least one or more processors of the vehicle. This ego-trajectory information may include at least one of direction of travel, velocity, range rate, and yaw rate, as determined from the radar detections and navigation data. At 2308, landmark data is extracted from the radar detections and the ego-trajectory information. At 2310, a normal distribution transformation grid is determined from the extracted landmark data and a radar reference map. At 2312, a vehicle pose is corrected according to the normal distribution transformation grid to localize the vehicle.

In this manner, the techniques and systems described herein use cost-effective systems, disregard dynamic objects, maximize a statistical distribution pattern, and handle static noise efficiently to accurately adjust the pose of a vehicle.

EXAMPLES

Example 1

A method of vehicle localization based on radar detections, the method comprising: receiving, by at least one processor of the vehicle, radar detections from one or more radar sensors of the vehicle; receiving, by the at least one processor, navigation data from one or more navigation units of the vehicle; outputting, by the at least one processor, ego-trajectory information about a current dynamic state of the vehicle; extracting, by the at least one processor and from the radar detections and the ego-trajectory information, landmark data; determining, by the at least one processor and from the extracted landmark data and a radar reference map, a normal distribution transformation grid; and responsive to determining the normal distribution transformation grid, correcting, by the at least one processor, a vehicle pose according to the normal distribution transformation grid to localize the vehicle.

Example 2

The method of example 1, wherein localizing the vehicle based on radar detections comprises: outputting the ego-trajectory information about the current dynamic state of the vehicle comprises executing a vehicle state estimator that outputs the ego-trajectory information about the current dynamic state of the vehicle based on the navigation data received from the one or more navigation units, the one or more navigation units comprising at least one or more of a global navigation satellite system, an inertial navigation system, or an odometer of the vehicle; and determining the normal distribution transformation grid comprises executing a scan-matcher configured to generate the normal distribution transformation grid based on the extracted landmark data and the radar reference map.

Example 3

The method of example 2, further comprising: using, by the vehicle state estimator, a previously corrected pose as a radar localization input to the vehicle state estimator for updating the ego-trajectory information about the current dynamic state of the vehicle; determining, based at least in part on the radar localization input, updated ego-trajectory information about the current dynamic state of the vehicle; and outputting, by the vehicle state estimator, the updated ego-trajectory information about the current dynamic state of the vehicle.

Example 4

The method of example 3, further comprising: extracting, by the at least one processor and from the radar detections and the updated ego-trajectory information, updated landmark data; determining, by the at least one processor and from the updated landmark data and the radar reference map, an updated normal distribution transformation grid; and responsive to determining the updated normal distribution transformation grid, correcting, by the at least one processor, an updated vehicle pose according to the updated normal distribution transformation grid to localize the vehicle.

Example 5

The method of example 1, wherein extracting landmark data from the radar detections and the ego-trajectory information further comprises: identifying, by a static object identifier, static radar detections from the received radar detections and the ego-trajectory information.

Example 6

The method of example 1, wherein extracting landmark data from the radar detections and the ego-trajectory information further comprises: generating, by an occupancy grid generator, a probability of an occupancy of any location in an environment around the vehicle, the probability being based on the radar detections and the ego-trajectory information.

Example 7

The method of example 1, wherein determining the normal distribution transformation grid from the extracted landmark data and the radar reference map comprises conditioning the extracted landmark data prior to determining the normal distribution transformation grid, the conditioning based on a quantity of landmark detections in an environment around the vehicle.

Example 8

The method of example 1, the method further comprising: determining a confidence level of an accuracy of the corrected pose; and using the confidence level in determining the pose of the vehicle according to the normal distribution transformation grid to localize the vehicle.

Example 9

A system for vehicle localization based on radar detections, the system comprising: one or more processors configured to: receive radar detections from one or more radar sensors; receive navigation data from one or more navigation units; output ego-trajectory information about a current dynamic state of the vehicle; extract, from the radar detections and the ego-trajectory information, landmark data; determine a normal distribution transformation grid from the extracted landmark data and a radar reference map; and responsive to determining the normal distribution transformation grid, correct a vehicle pose according to the normal distribution transformation grid to localize the vehicle.

Example 10

The system of example 9, wherein the one or more processors are configured to: output ego-trajectory information about a current dynamic state of the vehicle by at least: executing a vehicle state estimator that outputs the ego-trajectory information about the current dynamic state of the vehicle based on the navigation data received from the one or more navigation units, the one or more navigation units comprising at least one or more of a global navigation satellite system, an inertial navigation system, or an odometer of the vehicle; and determine a normal distribution transformation grid from the extracted landmark data and a radar reference map by at least: executing a scan-matcher configured to generate the normal distribution transformation grid based on the extracted landmark data and the radar reference map.

Example 11

The system of example 10, wherein the one or more processors are further configured to: use, by the vehicle state estimator, a previously corrected pose as a radar localization input to the vehicle state estimator for updating the ego-trajectory information about the current dynamic state of the vehicle; determine, based at least in part on the radar localization input, updated ego-trajectory information about the current dynamic state of the vehicle; and output, by the vehicle state estimator, the updated ego-trajectory information about the current dynamic state of the vehicle.

Example 12

The system of example 11, wherein the one or more processors are further configured to: extract, from the radar detections and the updated ego-trajectory information, updated landmark data; determine, from the updated landmark data and the radar reference map, an updated normal distribution transformation grid; and responsive to determining the updated normal distribution transformation grid, correct an updated vehicle pose according to the updated normal distribution transformation grid to localize the vehicle.

Example 13

The system of example 9, wherein the one or more processors are configured to extract, from the radar detections and the ego-trajectory information, landmark data by at least: executing a static-object identifier configured to identify static radar detections from the received radar detections and the ego-trajectory information.

Example 14

The system of example 9, wherein the one or more processors are configured to extract, from the radar detections and the ego-trajectory information, landmark data by at least: executing an occupancy grid generator configured to generate a probability of an occupancy of any location in an environment of the vehicle, the probability being based on the radar detections and the ego-trajectory information.

Example 15

The system of example 9, wherein the one or more processors are configured to determine the normal distribution transformation grid from the extracted landmark data and the radar reference map by at least: conditioning the extracted landmark data prior to determining the normal distribution transformation grid, the conditioning based on a quantity of landmark detections in an environment around the vehicle.

Example 16

The system of example 9, wherein the one or more processors are further configured to: determine a confidence level of an accuracy of the corrected pose; and use the confidence level in determining the pose of the vehicle according to the normal distribution transformation grid to localize the vehicle.

Example 17

A non-transitory computer-readable medium that stores instructions configured to cause a processing device to: receive radar detections from one or more radar sensors; receive navigation data from one or more navigation units; execute a vehicle state estimator that outputs ego-trajectory information about a current dynamic state of the vehicle based on the navigation data received from the one or more navigation units, the one or more navigation units comprising at least one or more of a global navigation satellite system, an inertial navigation system, or an odometer of the vehicle; extract, from the radar detections and the ego-trajectory information, landmark data; execute a scan-matcher configured to generate the normal distribution transformation grid based on the extracted landmark data and the radar reference map; and responsive to determining the normal distribution transformation grid, correct a vehicle pose according to the normal distribution transformation grid to localize the vehicle.

Example 18

The non-transitory computer-readable medium of example 17, wherein the instructions are further configured to cause a processing device to: use, by the vehicle state estimator, a previously corrected pose as a radar localization input to the vehicle state estimator for updating the ego-trajectory information about the current dynamic state of the vehicle; determine, based at least in part on the radar localization input, updated ego-trajectory information about the current dynamic state of the vehicle; and output, by the vehicle state estimator, the updated ego-trajectory information about the current dynamic state of the vehicle.

Example 19

The non-transitory computer-readable medium of example 17, wherein the instructions configured to cause a processing device to extract, from the radar detections and the ego-trajectory information, landmark data comprise at least: executing a static-object identifier configured to identify static radar detections from the received radar detections and the ego-trajectory information.

Example 20

The non-transitory computer-readable medium of example 17, wherein the instructions configured to cause a processing device to extract, from the radar detections and the ego-trajectory information, landmark data comprise at least: executing an occupancy grid generator configured to generate a probability of an occupancy of any location in an environment of the vehicle, the probability being based on the radar detections and the ego-trajectory information.

CONCLUSION

Although implementations of vehicle localization based on radar detections have been described in language specific to certain features and/or methods, the subject of the appended claims is not necessarily limited to the specific features or methods described. Rather, the specific features and methods are disclosed as example implementations for vehicle localization based on radar detections. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method of vehicle localization based on radar detections, the method comprising:
   receiving, by at least one processor of the vehicle, radar detections from one or more radar sensors of the vehicle;
   receiving, by the at least one processor, navigation data from one or more navigation units of the vehicle;
   receiving, by the at least one processor, a radar reference map, the radar reference map comprising Gaussians for respective cells of the radar reference map, the Gaussians comprising means and covariances of radar landmarks within the respective cells of the radar reference map;
   determining, by the at least one processor and from the navigation data, a vehicle pose of the vehicle;
   determining, by the at least one processor and from the radar detections, a radar occupancy grid;
   transforming, by the at least one processor, the radar occupancy grid to the radar reference map comprising the Gaussians using a scan-matcher; and
   responsive to the transforming, correcting, by the at least one processor, the vehicle pose based on a comparison of the radar reference map to the radar occupancy grid to localize the vehicle.

2. The method of claim 1, further comprising:
   identifying, by a static object identifier, static radar detections from the received radar detections, wherein the radar occupancy grid comprises information about the static radar detections.

3. A system for vehicle localization based on radar detections, the system comprising:
   one or more processors configured to:
      receive radar detections from one or more radar sensors;
      receive navigation data from one or more navigation units;
      receive a radar reference map, the radar reference map comprising Gaussians for respective cells of the radar reference map, the Gaussians comprising means and covariances of radar landmarks within the respective cells of the radar reference map;
      determine, from the navigation data, a vehicle pose of the vehicle;
      determine, from the radar detections, a radar occupancy grid;
      transform the radar occupancy grid to the radar reference map comprising the Gaussians using a scan-matcher; and
      responsive to the transform, correct the vehicle pose based on a comparison of the radar reference map to the radar occupancy grid to localize the vehicle.

4. The system of claim 3, wherein the one or more processors are further configured to:
   execute a static-object identifier configured to identify static radar detections from the received radar detections, wherein the radar occupancy grid comprises information about the static radar detections.

5. A non-transitory computer-readable medium that stores instructions configured to cause a processing device to:
   receive radar detections from one or more radar sensors;
   receive navigation data from one or more navigation units;
   receive a radar reference map, the radar reference map comprising Gaussians for respective cells of the radar reference map, the Gaussians comprising means and covariances of radar landmarks within the respective cells of the radar reference map;
   execute a vehicle state estimator that outputs ego-trajectory information about a current dynamic state of the vehicle based on the navigation data received from the one or more navigation units, the one or more navigation units comprising at least one or more of a global navigation satellite system, an inertial navigation system, or an odometer of the vehicle;
   determine, from the navigation data, a vehicle pose of the vehicle;
   determine, from the radar detections, a radar occupancy grid;
   transform the radar occupancy grid to the radar reference map comprising the Gaussians using a scan-matcher; and
   responsive to the transform, correct the vehicle pose based on a comparison of the radar reference map to the radar occupancy grid to localize the vehicle.

6. The non-transitory computer readable medium of claim 5, wherein the instructions are further configured to cause a processing device to:
   determine, from the radar occupancy grid, a normal distribution transform grid, the normal distribution transform grid comprising Gaussians for respective cells of the normal distribution transform grid, the Gaussians comprising means and covariances of the radar landmarks within the respective cells of the normal distribution transform grid.

7. The method of claim 1, wherein determining the vehicle pose is further determined from a previously corrected vehicle pose of the vehicle.

8. The method of claim 1, further comprising determining, by the at least one processor and from the radar occupancy grid, a normal distribution transform grid, the normal distribution transform grid comprising Gaussians for respective cells of the normal distribution transform grid, the Gaussians comprising means and covariances of the radar landmarks within the respective cells of the normal distribution transform grid.

9. The method of claim 8, further comprising, determining, by the at least one processor and from the radar occupancy grid, the radar landmarks.

10. The method of claim 9, further comprising, conditioning, by the at least one processor, the radar landmarks based on a quantity of landmark detections in an environment around the vehicle.

11. The method of claim 10, wherein the radar landmarks comprise clusters of occupied cells of the radar occupancy grid.

12. The method of claim 1, further comprising determining a confidence level of an accuracy of the corrected vehicle pose.

13. The method of claim 1, wherein the vehicle pose comprises at least one of: a direction of travel, a velocity, a range rate, or a yaw rate of the vehicle.

14. The system of claim 3, wherein the one or more processors are further configured to:
   determine the vehicle pose from a previously corrected vehicle pose of the vehicle.

15. The system of claim 3, wherein the one or more processors are further configured to:
   determine, from the radar occupancy grid, a normal distribution transform grid, the normal distribution transform grid comprising Gaussians for respective cells of the normal distribution transform grid, the Gaussians comprising means and covariances of the radar landmarks within the respective cells of the normal distribution transform grid.

16. The system of claim 15, wherein the one or more processors are further configured to:
   determine, from the radar occupancy grid, the radar landmarks.

17. The system of claim 16, wherein the one or more processors are further configured to:
   condition the radar landmarks based on a quantity of landmark detections in an environment around the vehicle.

18. The system of claim 17, wherein the radar landmarks comprise clusters of occupied cells of the radar occupancy grid.

19. The system of claim 3, wherein the one or more processors are further configured to:
   determining a confidence level of an accuracy of the corrected vehicle pose.

20. The system of claim 3, wherein the vehicle pose comprises at least one of: a direction of travel, a velocity, a range rate, or a yaw rate of the vehicle.

21. The non-transitory computer readable medium of claim 5, wherein the instructions are further configured to cause a processing device to:
   determine, from the radar occupancy grid, a normal distribution transform grid, the normal distribution transform grid comprising Gaussians for respective cells of the normal distribution transform grid, the Gaussians comprising means and covariances of the radar landmarks within the respective cells of the normal distribution transform grid.

* * * * *